US012770367B2

(12) United States Patent
Sjögren et al.

(10) Patent No.: US 12,770,367 B2
(45) Date of Patent: Oct. 20, 2026

(54) COMPUTER-IMPLEMENTED METHOD, COMPUTER PROGRAM PRODUCT AND SYSTEM FOR ANALYZING VIDEOS CAPTURED WITH MICROSCOPIC IMAGING

(71) Applicant: Sartorius Stedim Data Analytics AB, Umeå (SE)

(72) Inventors: Rickard Sjögren, Röbäck (SE); Christoffer Edlund, Umeå (SE); Mattias Sehlstedt, Umeå (SE)

(73) Assignee: Satorius Stedim Data Analytics AB (SE)

(*) Notice: Subject to any disclaimer, the term of this patent is extended or adjusted under 35 U.S.C. 154(b) by 697 days.

(21) Appl. No.: 17/928,204

(22) PCT Filed: May 19, 2021

(86) PCT No.: PCT/EP2021/063258
§ 371 (c)(1),
(2) Date: Nov. 28, 2022

(87) PCT Pub. No.: WO2021/239533
PCT Pub. Date: Dec. 2, 2021

(65) Prior Publication Data
US 2023/0215195 A1 Jul. 6, 2023

(30) Foreign Application Priority Data
May 29, 2020 (EP) .................................... 20177386

(51) Int. Cl.
*G06V 20/69* (2022.01)
*G06T 7/00* (2017.01)
(Continued)

(52) U.S. Cl.
CPC .......... *G06V 10/764* (2022.01); *G06T 7/0012* (2013.01); *G06T 7/20* (2013.01);
(Continued)

(58) Field of Classification Search
CPC .... G06V 10/764; G06V 10/24; G06V 10/761; G06V 10/82; G06V 20/48; G06V 20/49;
(Continued)

(56) References Cited

U.S. PATENT DOCUMENTS

2018/0035019 A1* 2/2018 Back .................... H04L 7/0075

OTHER PUBLICATIONS

Debidatta et al., "Temporal Cycle-Consistency Learning", IEEE, Pub.2019 (Year: 2019).*
(Continued)

*Primary Examiner* — Mekonen T Bekele
(74) *Attorney, Agent, or Firm* — Klarquist Sparkman, LLP

(57) ABSTRACT

A computer-implemented method is provided for analyzing videos of a living system captured with microscopic imaging. The method can include obtaining a base dataset including one or more videos captured with microscopic imaging with at least one of the one or more videos including a cellular event, and cropping out, from the base dataset, sub-videos including one or more objects of interest that may be involved in the cellular event. An artificial neural network (ANN) model can be trained using the plurality of selected sub-videos as training data, to perform unsupervised video alignment, a query sub-video can be aligned using the trained ANN model, and a determination can be made whether or not the query sub-video includes the cellular event.

15 Claims, 18 Drawing Sheets

(51) Int. Cl.
*G06T 7/20* (2017.01)
*G06T 7/70* (2017.01)
*G06V 10/24* (2022.01)
*G06V 10/74* (2022.01)
*G06V 10/764* (2022.01)
*G06V 10/82* (2022.01)
*G06V 20/40* (2022.01)

(52) U.S. Cl.
CPC ................ *G06T 7/70* (2017.01); *G06V 10/24* (2022.01); *G06V 10/761* (2022.01); *G06V 10/82* (2022.01); *G06V 20/48* (2022.01); *G06V 20/49* (2022.01); *G06V 20/695* (2022.01); *G06V 20/698* (2022.01); *G06T 2207/10056* (2013.01); *G06T 2207/20081* (2013.01); *G06T 2207/20084* (2013.01); *G06T 2207/30024* (2013.01)

(58) Field of Classification Search
CPC .. G06V 20/695; G06V 20/698; G06T 7/0012; G06T 7/20; G06T 7/70; G06T 2207/10056; G06T 2207/20081; G06T 2207/20084; G06T 2207/30024
See application file for complete search history.

(56) References Cited

OTHER PUBLICATIONS

Gunho Choi et al., "Cycle-consistent deep learning approach to coherent noise reduction in optical diffraction tomography", pub Feb. 19, 2019 (Year: 2019).*

Gunho et al., , "Cycle-consistent deep learning approach to coherent noise reduction in optical diffraction tomography", pub Feb. 19, 2019 (Year: 2019).*

Debidatta et al., "Temporal Cycle-Consistency Learning", IEEE (Year: 2019).*

Buggenthin et al., "Prospective identification of hematopoietic lineage choice by deep learning," *Nature Methods* 14(4): 403-406, Apr. 2017.

Castleman et al., "Karyotype analysis by computer and its application to mutagenicity testing of environmental chemicals," *Mutation Research/Fundamental and Molecular Mechanisms of Mutagenesis* 41(1): 153-161, Nov. 1976.

Dwibedi et al., "Temporal cycle-consistency learning," In *Proceedings of the IEEE/CVF Conference on Computer Vision and Pattern Recognition*, pp. 1801-1810, 2019.

International Search Report and Written Opinion, mailed Jun. 22, 2021, issued for International Patent Application No. PCT/EP2021/063258, 9 pages.

Ronneberger et al., "U-net: Convolutional networks for biomedical image segmentation," In *International Conference on Medical Image Computing and Computer-Assisted Intervention*, pp. 234-241. Springer, Cham, Oct. 2015.

Tsai et al., "Usiigaci: Instance-aware cell tracking in stain-free phase contrast microscopy enabled by machine learning," *SoftwareX* 9: 230-237, Jan. 2019.

Wienert et al., "Detection and segmentation of cell nuclei in virtual microscopy images: a minimum-model approach," *Scientific Reports* 2(1): 1-7, Jul. 2012.

Boulanger et al., "A patch-based method for repetitive and transient event detection in fluorescence imaging," *PloS One* 5(10): e13190, Oct. 2010.

Chen et al., "Video sequence matching based on temporal ordinal measurement," *Pattern Recognition Letters* 29(13): 1824-1831, Oct. 2008.

Phan et al., "An unsupervised long short-term memory neural network for event detection in cell videos," *arXiv preprint arXiv*:1709.02081, Sep. 2017.

* cited by examiner (a) Dead cell (b) Dividing HeLa cell (c) Non-dividing HeLa cells

COMPUTER-IMPLEMENTED METHOD, COMPUTER PROGRAM PRODUCT AND SYSTEM FOR ANALYZING VIDEOS CAPTURED WITH MICROSCOPIC IMAGING

CROSS REFERENCE TO RELATED APPLICATIONS

This is the U.S. National Stage of International Application No. PCT/EP2021/063258 filed May 19, 2021, which was published in English under PCT Article 21(2), which in turn claims the benefit of European Patent Application No. 20 177 386.8, filed May 29, 2020. The prior applications are incorporated herein by reference in their entirety.

The application relates to a computer-implemented method, a computer program product and a system for analyzing videos, in particular, for analyzing videos of a living system captured with microscopic imaging.

BACKGROUND

High-throughput microscopy has become an indispensable tool to study, for example, biology and effects of new treatments during early drug discovery. In comparison to molecular analysis of cell cultures, for example, imaging is non-invasive, in other words, live cells can be pictured over time to give rich insight to biology.

Although using computer vision in biological imaging dates back many decades (see e.g., Castleman, K. R., Melnyk, J., Frieden, H. J., Persinger, G. W. & Wall, R. J. "Karyotype analysis by computer and its application to mutagenicity testing of environmental chemicals", Mutat. Res. Mol. Mech. Mutagen. 41, 153-161 (1976)), computer vision is becoming ever-more important to handle the output from high-throughput imaging platforms. The field of computer vision, not only limited to cell imaging, has been revolutionized by deep convolutional neural networks (CNNs) in the past decade. In live cell imaging, deep learning is increasingly used, for example, to detect and segment cells (see e.g., Wienert, S. et al., "Detection and Segmentation of Cell Nuclei in Virtual Microscopy Images: A Minimum-Model Approach", Sci. Rep. 2, 503 (2012); Ronneberger, O., Fischer, P. & Brox, "T. U-Net: Convolutional Networks for Biomedical Image Segmentation", ArXiv150504597 Cs (2015); Tsai, H.-F., Gajda, J., Sloan, T. F. W., Rares, A. & Shen, A. Q. Usiigaci, "Instance-aware cell tracking in stain-free phase contrast microscopy enabled by machine learning", SoftwareX 9, 230-237 (2019)), follow cell movement over time (see e.g., Tsai, H.-F., Gajda, J., Sloan, T. F. W., Rares, A. & Shen, A. Q. Usiigaci, "Instance-aware cell tracking in stain-free phase contrast microscopy enabled by machine learning", SoftwareX 9, 230-237 (2019)), forecast cell differentiation (see e.g., Buggenthin, F. et al., "Prospective identification of hematopoietic lineage choice by deep learning", Nat. Methods 14, 403-406 (2017)), etc.

Even though imaging may be performed over time, analysis of the images is often performed in a snap-shot fashion (in other words, each frame may be analyzed independently) disregarding temporal links between consequent images. Further, most existing approaches of image analysis may be limited to supervised methods to analyze image data. With supervised methods, what is known beforehand can be captured well but discovering novel events may be challenging.

SUMMARY

According to an aspect, the problem relates to providing improved analysis of videos including a cellular event that occurs over time.

This problem is solved by the features disclosed by the independent claims. Further exemplary embodiments are defined by the dependent claims.

According to an aspect, a computer-implemented method is provided for analyzing videos of a living system captured with microscopic imaging. The method comprises:

- obtaining a base dataset including one or more videos captured with microscopic imaging, at least one of the one or more videos including a cellular event;
- cropping out, from the base dataset, sub-videos including one or more objects of interest that may be involved in the cellular event;
- receiving information indicating a plurality of sub-videos selected from among the sub-videos that are cropped out from the base dataset, the plurality of selected sub-videos including the cellular event;
- training an artificial neural network, ANN, model, using the plurality of selected sub-videos as training data, to perform unsupervised video alignment;
- obtaining a query sub-video, the query sub-video being:
  - one of the sub-videos that are cropped out from the base dataset, or
  - a sub-video cropped out from a video that is captured with microscopic imaging and that is not included in the base dataset;
- aligning, using the trained ANN model, the query sub-video with a reference sub-video that is one of the plurality of selected sub-videos; and
- determining, according to a result of the aligning, whether or not the query sub-video includes the cellular event.

In the present disclosure, a "living system" may comprise, for example, one or more living cell cultures, one or more tumor spheroids, one or more organoids, one or more tissues, living cells, in vitro cells, single cells, and/or the like.

In the present disclosure, the term "video" may be understood as a digital video that comprises a sequence of digital images captured over time. Each digital image captured at a certain point in time may be referred to as a "frame" of the video. Further, in the present disclosure, the term "image" may refer to a digital image corresponding to a frame of a video.

In various embodiments and examples described herein, the one or more videos included in the base dataset may be one or more time-lapse videos. In some circumstances, a time-lapse video may be captured throughout one experiment on a living system to be captured, in other words, in one relatively long time-lapse (e.g., a few hours, a few days, a few weeks). The length of the time-lapse may be defined relative to the length of the experiment during which the one or more videos are captured. A specific example may include cell culture of cancer cells growing over the course of a few days, for instance four days. A long time-lapse may, in this specific example, stretch over those few days. Another specific example may include a cell differentiation experiment that may run over the course of several weeks, for instance two weeks, and corresponding long time-lapse may then stretch over those weeks. In other circumstances, a time-lapse video may be captured at a certain point in time with a high framerate over a limited period of time (e.g., a few seconds, a few minutes, a few hours, etc.). In such a case, the base dataset may include time-lapse videos captured at certain points in time during one experiment, in other words, may include one or more "bursts" of time-lapse. Here, the "high framerate" may be defined relative to how fast the event of interest occur in the biological specimen, for example. A specific example may include cell division in untreated HeLa-cells, which may be studied in enough detail of one frame every 15 minutes. The "limited period of time" may need to be long enough to capture the event of interest occurring in the biological specimen. A specific example may include studying cell division in untreated HeLa-cells, which can be studied in enough detail using limited periods, e.g., "bursts", 5 hour long with 6 hour gaps between each burst.

Further, in various embodiments and examples described herein, the one or more videos included in the base dataset may be captured using a microscopic imaging device such as a light microscope, a fluorescence microscope or an electron microscope. In various embodiments and examples described herein, images captured as parts of the videos may be, but are not limited to, phase contrast images, bright field images, fluorescence images (e.g., of a fluorescently labelled living system), etc. Each of the images may also be a multi-channel combination of two or more images. The multi-channel combination may, in some examples, be a combination of one or more fluorescence images capturing fluorescent light of different wavelengths. In some further examples, the multi-channel combination may be a combination of one or more light images with one or more fluorescent images. In some further examples, the multi-channel combination may also be a combination of light images of varying focus planes or type.

In the present disclosure, a cellular event may be an event that involves at least one cell and that may occur over a certain period of time. Examples of a cellular event may include, but are not limited to, a cell division, cell crawling, a type of cells latching on to another type of cells (e.g., immune cells latching on to cancer cells), neutrophils undergoing NETosis, cells undergoing apoptosis and cell differentiation in which a type of cell changes to another type of cell (e.g., change from a stem cell into an immune cell).

In the present disclosure, the term "sub-video" may be understood as a part of a video, the part including at least one area within one or more frames of the video.

In various aspects and embodiments as described herein, the sub-videos cropped out from the base dataset may follow the one or more objects of interest throughout a time duration of the videos (e.g., throughout the time-lapse) included in the base dataset. For example, in case the one or more objects of interest are not motile (e.g., the object(s) does/do not move out of a relatively small area over time), once an area with the one or more objects of interest within a frame (e.g., the first frame) of a video included in the base dataset is identified and localized, the area within each frame at a fixed position may be cropped out throughout the time duration (e.g., time-lapse) of the video to be comprised in a sub-video. More than one sub-videos may be cropped out from one video included in the base dataset. Accordingly, a sub-video may contain an area smaller than a whole area of a video from which the sub-video is cropped out.

A sub-video may constitute a complete field of view or a limited field of view around an object field of view.

In the present disclosure, the terms, "video alignment" and "aligning" a video with another video, may be understood as determining temporal correspondences between pairs of frames from two different videos showing the same, similar or corresponding stages (and/or instances) of an event of interest over time.

In the present disclosure, the term "unsupervised" video alignment may be understood as performing the video alignment with data that contain no explicit information on how to align the videos.

From among the sub-videos cropped out from the base dataset, a plurality of sub-videos that include the cellular event may be selected. The plurality of selected sub-videos may be used subsequently as training data for training the ANN model for unsupervised video alignment. In some circumstances, the selection may be made manually by, for example, a user (e.g., biologist) who is knowledgeable about the cellular event. The number of the plurality of selected sub-videos may be smaller than the number of sub-videos cropped out from the base dataset. In some preferred exemplary embodiments, only a limited number of sub-videos are selected from among the sub-videos cropped out from the base dataset. For specific example, fewer than 100 sub-videos may be selected as the plurality of selected sub-videos to be used as the training data for training the ANN model for unsupervised video alignment. Use of a relatively small number of the selected sub-videos as training data can provide data efficient analysis of videos of the living system.

With the method according to the above-stated aspect, since the determination as to whether or not a query sub-video includes a cellular event is made based on a result of aligning the query sub-video with a reference sub-video using the trained ANN model for unsupervised video alignment, analysis of events with strong time dependencies, for instance cell division, can be made. Such analysis may be difficult with snap-shot based analysis where time dependencies are not taken into consideration.

In various aspects and embodiments described herein, each of the one or more objects of interest may be a cell or a group of cells.

In various aspects and embodiments described herein, the training of the ANN model may be performed based on temporal cycle-consistency learning.

In the method according to any one of the above-stated aspect and various embodiments thereof, the aligning of the query sub-video with the reference sub-video may comprise:

- determining, for each frame of the query sub-video, a distance from the frame of the query sub-video to a frame, of the reference sub-video, which is considered to be a nearest neighbor of the frame of the query sub-video; and
- determining an alignment score of the query sub-video based on the distance determined for each frame of the query sub-video,
- wherein the determination as to whether or not the query sub-video includes the cellular event is made based on the alignment score.

Further, in the method according to any one of the above-stated aspect and various embodiments thereof, the cropping out of the sub-videos may include:

- identifying and localizing the one or more objects of interest within the one or more videos included in the base dataset using a localization algorithm,
- wherein the localization algorithm may be a convolutional neural network trained for detecting the one or more objects of interest.

Further, in some exemplary embodiments, the cropping out of the sub-videos may include:

- processing the base dataset according to a tracking algorithm to follow movement of the one or more objects of interest between frames of each video included in the base dataset.

For example, in case the one or more objects of interest are highly motile objects, applying a tracking algorithm as stated above may be advantageous to follow the one or more objects which can be in different positions in different frames.

Moreover, the method according to any one of the above-stated aspect and various embodiments thereof may further comprise, before cropping out the sub-videos:

processing the base dataset according to a video stabilization algorithm for reducing effect of jitter between frames of each video included in the base dataset.

According to another aspect, a computer-implemented method is provided for analyzing videos of a living system captured with microscopic imaging. The method comprises:

obtaining a base dataset including one or more videos captured with microscopic imaging, at least one of the one or more videos including a cellular event;

cropping out, from the base dataset, sub-videos including one or more objects of interest that may be involved in the cellular event;

receiving information indicating a plurality of sub-videos selected from among the sub-videos that are cropped out from the base dataset, the plurality of selected sub-videos including the cellular event;

training an artificial neural network, ANN, model, using the plurality of selected sub-videos as training data, to perform unsupervised video alignment; and storing, in a storage medium, the trained ANN model and at least one of the plurality of selected sub-videos.

According to yet another aspect, a computer-implemented method is provided for analyzing videos of a living system captured with microscopic imaging. The method comprises:

obtaining an artificial neural network, ANN, model from a storage medium, wherein the ANN model has been trained, using a plurality of selected sub-videos as training data, to perform unsupervised video alignment, wherein the plurality of selected sub-videos includes a cellular event and are selected from among sub-videos that are cropped out from a base dataset including one or more videos captured with microscopic imaging, at least one of the one or more videos including the cellular event;

obtaining a query sub-video, the query sub-video being:

one of the sub-videos that are cropped out from the base dataset, or a sub-video cropped out from a video that is captured with microscopic imaging and that is not included in the base dataset;

aligning, using the ANN model, the query sub-video with a reference sub-video that is one of the plurality of selected sub-videos; and determining, according to a result of the aligning, whether or not the query sub-video includes the cellular event.

According to yet another aspect, a computer program product is provided. The computer program product comprises computer-readable instructions that, when loaded and run on a computer, cause the computer to perform the method according to any one of the above-stated aspects and various embodiments thereof.

According to yet another aspect, a system is provided for analyzing videos of a living system captured with microscopic imaging. The system comprises:

a storage medium storing a base dataset including one or more videos captured with microscopic imaging, at least one of the one or more videos including a cellular event and an artificial neural network, ANN, model for performing unsupervised video alignment; and a processor configured to:

obtain the base dataset from the storage medium;

crop out, from the base dataset, sub-videos including one or more objects of interest that may be involved in the cellular event;

receive information indicating a plurality of sub-videos selected from among the sub-videos that are cropped out from the base dataset, the plurality of selected sub-videos including the cellular event;

train the ANN model, using the plurality of selected sub-videos as training data, to perform unsupervised video alignment;

obtain a query sub-video, the query sub-video being:

one of the sub-videos that are cropped out from the base dataset, or a sub-video cropped out from a video that is captured with microscopic imaging and that is not included in the base dataset;

align, using the trained ANN model, the query sub-video with a reference sub-video that is one of the plurality of selected sub-videos; and determine, according to a result of the aligning, whether or not the query sub-video includes the cellular event.

In the system according to the above-stated aspect, each of the one or more objects of interest is a cell or a group of cells.

Further, in the system according to the above-stated aspect, the training of the ANN model may be performed based on temporal cycle-consistency learning.

In the system according to the above-stated aspect, the processor may be further configured to, when aligning the query sub-video with the reference sub-video:

determine, for each frame of the query sub-video, a distance from the frame of the query sub-video to a frame, of the reference sub-video, which is considered to be a nearest neighbor of the frame of the query sub-video; and determine an alignment score of the query sub-video based on the distance determined for each frame of the query sub-video, wherein the determination as to whether or not the query sub-video includes the cellular event is made based on the alignment score.

In the system according to the above-stated aspect, the processor may be further configured to, when cropping out the sub-videos:

identify and localize the one or more objects of interest within the videos included in the base dataset using a localization algorithm, wherein the localization algorithm may be a convolutional neural network trained for detecting the one or more objects of interest; and/or process the base dataset according to a tracking algorithm to follow movement of the one or more objects of interest between frames of each video included in the base dataset.

In the system according to the above-stated aspect, the processor may be further configured to, before cropping out the sub-videos:

process the base dataset according to a video stabilization algorithm for reducing effect of jitter between frames of each video included in the base dataset.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general purpose computer system. In other examples, the system may be a special purpose computer system including an embedded system.

In some circumstances, any one of the above stated aspects as well as any one of various embodiments and examples described herein may provide one or more of the following advantages:

- enabling search for a type of cellular event in a database of many videos by learning typical features of the type of cellular event;
- facilitating analysis of a type of cellular event which may otherwise be detected using fluorescent labels, for example, FUCCI (fluorescence ubiquitination cell cycle indicator) cell cycle marker which is commonly used to study cell division;
- capable of modeling temporal behavior of living systems, which can enable insight in biological phenomena not visible in snap-shots;
- providing flexibility, since new types of events of interest can easily be analyzed by selecting a limited number of exemplary sub-videos as training data for the ANN model for unsupervised video alignment;
- providing scalability, since datasets of any size can be analyzed in a straightforward manner with the ANN model trained using only a limited dataset;

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

In live cell imaging, for example, analysis may be typically made in a snap-shot fashion, in other words, each frame may be analyzed independently, and the time trajectories over individual time-points may then be analyzed. This approach disregards that there can be an inherent time dependency in biological systems. For example, in case of analyzing images of cell division, it may be very difficult to assess from a single image whether the image shows an ongoing, successful cell division, or the image shows a cell with arrested cell cycle. At a standard resolution, it may even be difficult to determine whether a cell is curled up due to its dividing or due to being dead. If the cell is followed over time, however, it may be trivial to determine whether there is an ongoing cell division. Other cellular events that may be difficult to analyze in a snap-shot fashion may include, but are not limited to, cell crawling, a type of cells latching on to another type of cells (e.g., immune cells latching on to cancer cells), neutrophils undergoing NETosis, cells undergoing apoptosis and cell differentiation in which a type of cell changes to another type of cell (e.g., change from a stem cell into an immune cell). Analysis on cellular events over time may contribute to study for biopharmaceutical drug development, for example.

In some aspects, the present disclosure relates to learning a representation of a cellular event of interest from a small selected dataset and then use the learned representation to retrieve events from a large dataset in order to quantify and/or characterize the event.

System Configuration

Figure 1:
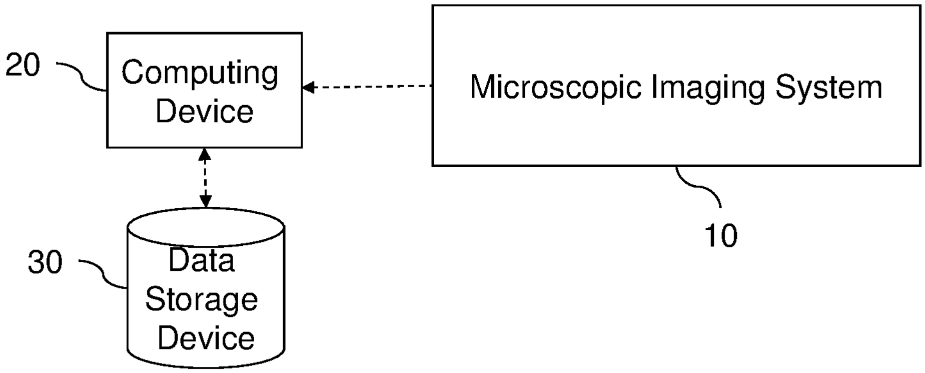
FIG. 1 shows a schematic diagram of an exemplary system for analyzing videos of a living system captured with microscopic imaging.

FIG. 1 shows a schematic diagram of an exemplary system for analyzing videos of a living system captured with microscopic imaging. The exemplary system shown in FIG. 1 comprises a microscopic imaging system 10, a computing device 20 and a data storage device 30.

The microscopic imaging system 10 may be configured to capture images and videos of a living system (e.g., one or more living cell cultures, one or more tumor spheroids, one or more organoids, one or more tissues, and/or the like) with microscopy and to provide the captured images and/or videos to the computing device 20. For example, the microscopic imaging system 10 may comprise a microscopic imaging device (not shown) such as a light microscope, a fluorescence microscope or an electron microscope. In some examples, the microscopic imaging system 10 may also comprise a support with an enclosure for placing the living system to be imaged in conditions (e.g., temperature, humidity, etc.) appropriate for observation.

The computing device 20 may be a computer connected to the microscopic imaging system 10 via (a) wired and/or wireless communication network(s). The computing device 20 may obtain data regarding operations of the microscopic imaging system 10. For example, the computing device 20 may receive the videos captured by the microscopic imaging system 10. In some circumstances, the computing device 20 may also receive, from the microscopic imaging system 10, information indicating operating conditions under which the videos have been captured. The computing device 20 may be configured to perform a method according to various embodiments and examples described herein. The data storage device 30 may store information that is used by the computing device 20 and/or information that is generated by the computing device 20.

It is noted that the microscopic imaging system 10, the computing device 20 and the data storage device 30 may either be incorporated into a single device with one body or implemented with more than one separate devices. Further, the computing device 20 may be implemented with more than one computer connected to each other via (a) wired and/or wireless communication network(s).

Video Alignment and Determination of a Cellular Event

Figure 2:
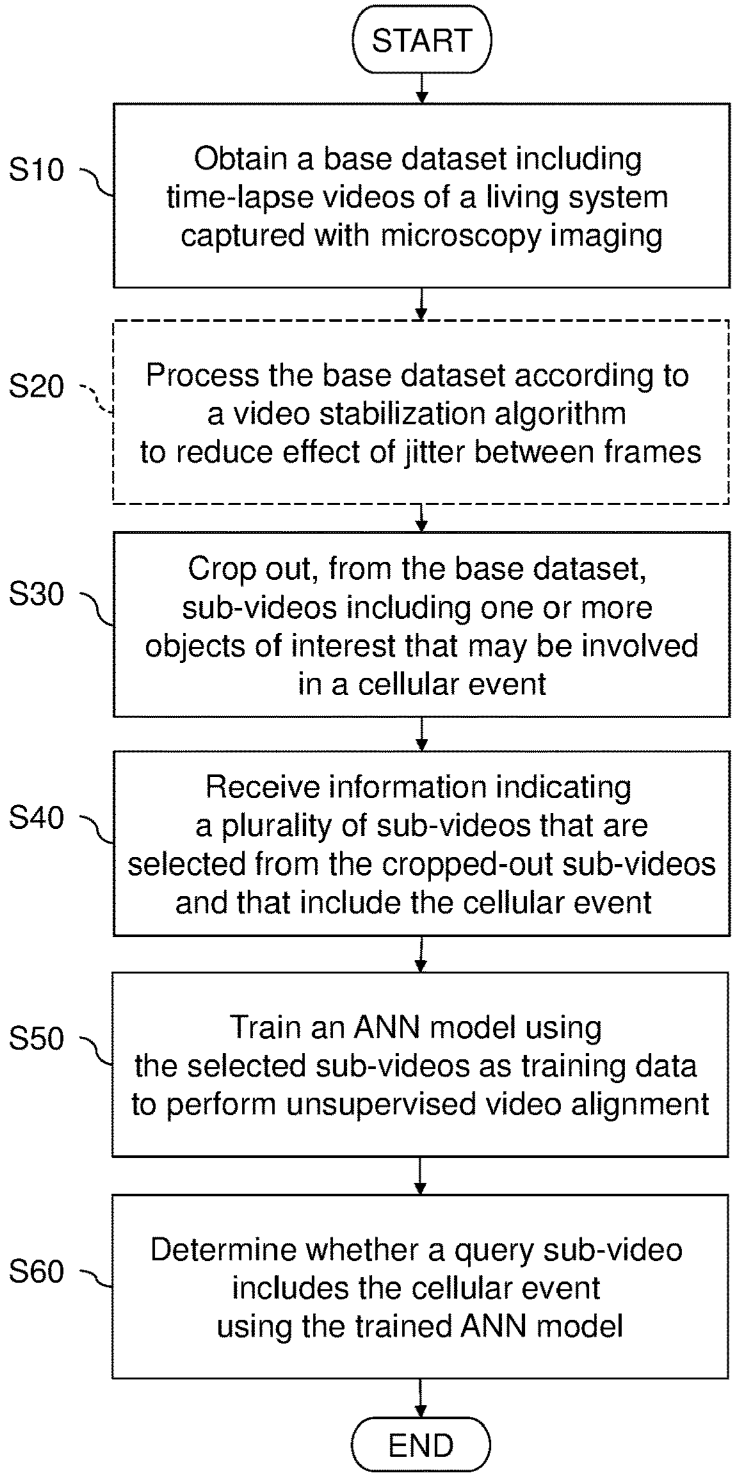
FIG. 2 shows a flowchart of an exemplary process performed by the system shown in FIG. 1.

FIG. 2 shows a flowchart of an exemplary process performed by the system shown in FIG. 1. The exemplary process may be performed by the computing device 20 shown in FIG. 1. The exemplary process may start, for example, when the computing device 20 receives, via an input device (not shown), an instruction from a user to start the exemplary process.

In step S10, the computing device 20 may obtain a base dataset including one or more videos of a living system captured with microscopy imaging, e.g., by the microscopic imaging system 10. At least one of the one or more videos may include a cellular event that involves at least one cell and that may occur over a certain period of time. Examples of a cellular event may include, but are not limited to, a cell division, cell crawling, a type of cells latching on to another type of cells (e.g., immune cells latching on to cancer cells), neutrophils undergoing NETosis, cells undergoing apoptosis.

In some examples, the videos included in the base dataset may be time-lapse videos. A time-lapse video may be either a video captured throughout one experiment on the living system to be captured or a video captured at a certain point in time with a relatively high frame rate over a limited period of time during one experiment. A specific example may include collecting time-lapse for limited periods of five hours acquiring a frame every 15 minutes with six hour gaps between each acquisition period over the time course of four days to study cell division in untreated HeLa-cells. In a specific example, a time-lapse video dataset of one or more living cell cultures, captured by the microscopic imaging system 10, may be obtained as the base dataset in step S10.

In some examples, images that are comprised in the videos of the base dataset as frames may be phase contrast images or bright field images. In some other examples, the images may be fluorescence images of a fluorescently labeled living system. In yet further examples, each of the images may be a multi-channel combination of two or more kinds of images, for instance, a combination of one or more fluorescence images capturing fluorescent light of different wavelengths, a combination of one or more light images with one or more fluorescent images, a combination of light images of varying focus planes or type, etc.

After step S10, the process may proceed to step S20 and the computing device 20 may process the base dataset according to a video stabilization algorithm to reduce effect of jitter between frames. The jitter may result from difficulty to relocate the microscope object to the exact same location between frames, for example. It is noted that step S20 is an optional step which may be skipped in some circumstances.

After step S20 (or after step S10, in case step S20 is skipped), the process may proceed to step S30 and the computing device 20 may crop out, from the base dataset, sub-videos including one or more objects of interest that may be involved in a cellular event. In some examples, the one or more objects of interest may be a cell or a group of cells. More specifically, each individual cell or cells of a specific type such as cancer cell can be the one or more objects of interest. The one or more objects of interest may be defined as appropriate for the cellular event to be analyzed.

In order to crop out the sub-videos, the computing device 20 may identify and localize (in other words, detect and determine the position(s) of) the one or more objects of interest in the base dataset. For example, in case of analyzing videos of a cell culture, each frame in the videos may typically contain many individual cells as the objects of interest. Accordingly, the initial step may be to localize the cells for cropping out the sub-videos following the cells through the frames.

For localization, a known localization algorithm may be used. A localization algorithm may employ computer vision algorithms to identify and localize the one or more objects of interest in an image. An example of a localization algorithm may be a convolutional neural network (CNN) trained for object detection within images. Another example of a localization algorithm may be a nucleus detection algorithm processing images of fluorescently labelled cells. Alternatively, the images may be divided into fixed sub-images covering all or part of the original images.

Once the one or more objects of interest are identified and localized in (at least some of the frames from) the videos included in the base dataset, sub-videos following the one or more objects of interest throughout the duration of each video (e.g., each time-lapse) may be cropped out. A sub-video may constitute a complete field of view, or a limited field of view around an object field of view.

For highly motile objects (e.g., objects that move from one position to another between frames), it may be advantageous to apply a tracking algorithm to follow the movements of the objects of interest between frames. Examples of the tracking algorithm may include, but are not limited to, the Kanade-Lucas-Tomasi feature tracker (see e.g., Lucas, Bruce D., and Takeo Kanade. "An iterative image registration technique with an application to stereo vision." (1981): 674), mean-shift algorithm (see e.g., Cheng, Yizong. "Mean shift, mode seeking, and clustering." IEEE transactions on pattern analysis and machine intelligence 17.8 (1995): 790-799), multiple instance learning algorithms (see e.g., Babenko, Boris, Ming-Hsuan Yang, and Serge Belongie. "Visual tracking with online multiple instance learning." 2009 IEEE conference on computer vision and pattern recognition. IEEE, 2009), the GOTURN tracker (see e.g., Held, David, Sebastian Thrun, and Silvio Savarese. "Learning to track at 100 fps with deep regression networks." European Conference on Computer Vision. Springer, Cham, 2016), etc.

For less motile objects (e.g., objects that do not move out of a relatively small area over time between the frames), it may be sufficient to localize the objects of interest in the first frame of a video and then crop an area in a fixed position throughout the duration (e.g., time-lapse) of the video.

Figure 3:
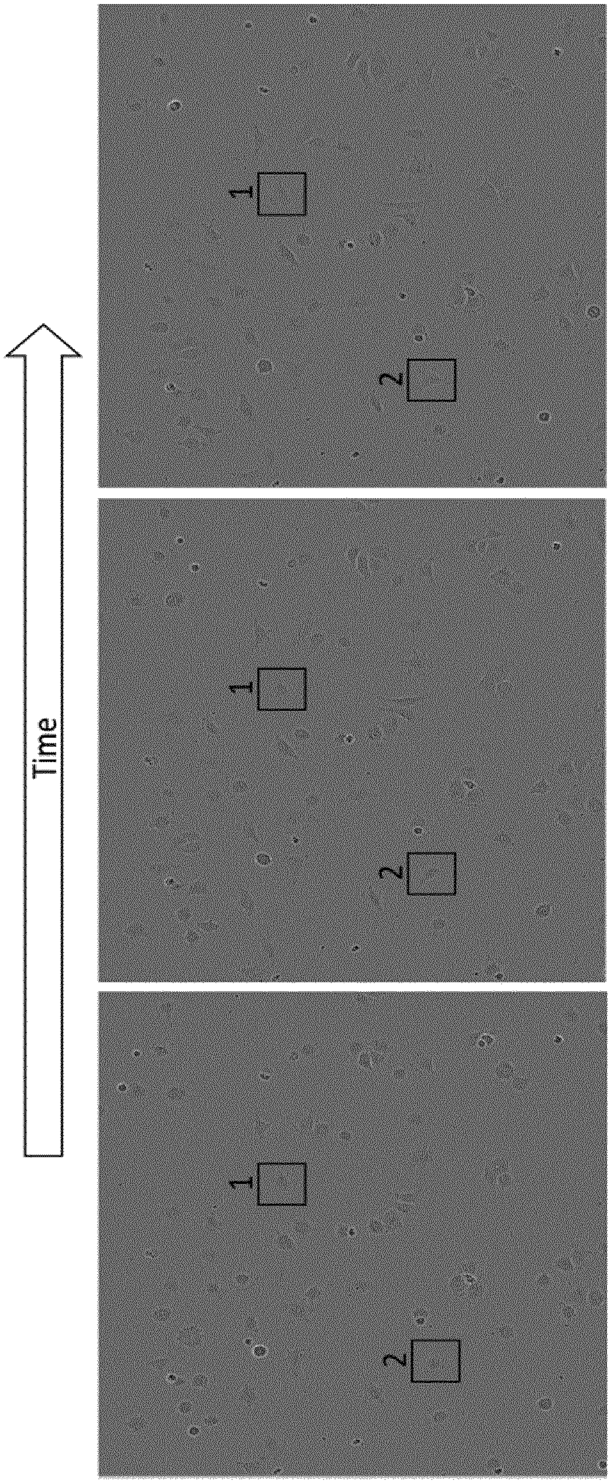
FIG. 3 shows examples of frames of a video included in a base dataset.

FIG. 3 shows specific examples of frames of a video included in a base dataset. The specific examples shown in FIG. 3 are three frames from a time-lapse video of growing HeLa cells. Since the HeLa cells move very little between frames, it may be sufficient to localize the cells in the first frame of the sequence of the time-lapse video and crop out the same position from each frame. In the specific example shown in FIG. 3, two cells are identified and localized within areas indicated by boxes 1 and 2 using a localization algorithm. The boxes 1 and 2 indicate the field-of-view of two resulting sub-videos after cropping. Particularly in the specific example of FIG. 3, every crop (e.g., each of the areas 1 and 2) is the same size and at the same position across the frames. Since some types of cells other than the HeLa cells may move much more between the frames, a tracking algorithm may need to be used in order to follow an individual cell over time in such a case.

After the one or more objects of interest (e.g., one or more cells) have been cropped out to sub-videos, a dataset of sequences of the one or more objects of interest over time with no alignment may be obtained.

Referring again to FIG. 2, the process may proceed to step S40 after cropping out sub-videos from the base dataset in step S30. In step S40, the computing device 20 may receive information indicating a plurality of sub-videos that are selected from the cropped-out sub-videos and that include the cellular event. For example, a limited set of sub-videos displaying the one or more objects of interest performing the cellular event may be selected from the sub-videos cropped out in step S30. In some examples, the selection may be made manually by a user (e.g., biologist) who is knowledgeable about the cellular event. The information indicating the selection made by the user may be provided to the computing device 20 via, e.g., an input device (not shown) and/or a communication network (not shown). In some specific examples, fewer than 100 sub-videos may be selected. The selected sub-videos may be used as training data for training an artificial neural network (ANN) model for unsupervised video alignment in the following step S60.

After step S40, the computing device 20 may train the ANN model using the selected sub-videos as training data to perform unsupervised video alignment. For example, the computing device 20 may train the ANN model based on temporal cycle consistency learning (TCC) (see e.g., Dwibedi, D., Aytar, Y., Tompson, J., Sermanet, P. & Zisserman, "A. Temporal Cycle-Consistency Learning". in 1801-1810 (2019)). TCC is a method for aligning a self-supervised fashion using deep learning to learn an embedded video representation that is consistent when finding the nearest neighbor in another video and then going back again.

Figure 4:
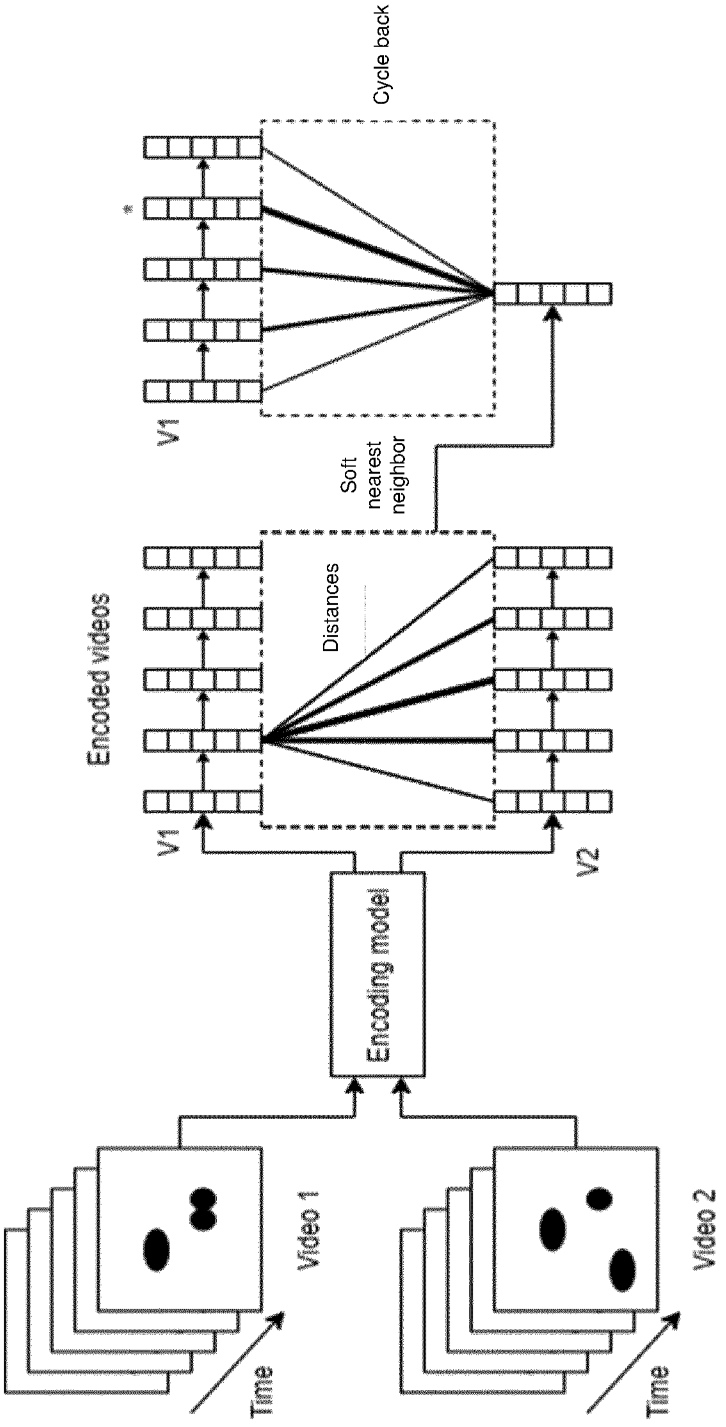
FIG. 4 shows a schematic diagram illustrating temporal cycle consistency learning.

FIG. 4 shows a schematic diagram illustrating TCC learning to perform unsupervised alignment of video sequences. By video "alignment", events or actions (e.g., a cellular event such as a cell division) that occur in videos, not necessarily at the same time, can be aligned in the time dimension. By "unsupervised" video alignment, the ANN model training protocol can align the videos even when processing data (e.g., training data) that contain no explicit information on how to align the videos.

For each training iteration, TCC may take two videos as input, e.g., videos 1 and 2 in FIG. 4, where each video comprises a fixed sequence of images (e.g., frames). The videos may be passed to an encoding model. The encoding model may be an ANN that transforms the videos into sequences of vectors, one vector per frame, referred to as the "encoded representation" of the videos. The encoding model may be updated to minimize a temporal cycle consistency loss across the sequences.

More specifically, for a given encoded frame $u_i$ in video 1, the soft nearest neighbor $\tilde{v}$ in video 2 may be found according to $$\tilde{v} = \sum \alpha_j v_j,$$

$$\alpha_j = \frac{e^{-|u_i - v_j|^2}}{\sum e^{-|u_i - v_k|^2}},$$

where:

where each $v_k$ may be an encoded frame in video 2, and $|u_i - v_k|^2$ may denote a squared Euclidean norm between $u_i$ and $v_k$.

From the soft nearest neighbor $\tilde{v}$ in video 2, the nearest neighbor may be cycled back to video 1. In FIG. 4, a frame in video 1 is marked with an asterisk to indicate a frame that is closest to the soft nearest neighbor in video 2 (in other words, the soft nearest neighbor in video 1 calculated with respect to the frame in video 2 identified as the soft nearest neighbor $\tilde{v}$ of the frame $u_i$ in video 1). In the document, Dwibedi, D., Aytar, Y., Tompson, J., Sermanet, P. & Zisserman, "A. Temporal Cycle-Consistency Learning". in 1801-1810 (2019), among several functions disclosed for calculating the cycle back consistency loss, it is proposed to use a so-called, "cycle-back regression loss". In some exemplary embodiments of the present disclosure, the cycle-back regression loss may be used for training the ANN model in step S50 of FIG. 2. One of the other cycle back consistency loss functions, however, may also be used for the training in step S50. To calculate the cycle-back regression loss in some exemplary embodiments, the proximity $\beta_i$ between the nearest neighbor $\tilde{v}$ and the original frame $u_i$ may be first calculated as:

$$\beta_i = \frac{e^{-|\tilde{v} - u_i|^2}}{\sum e^{-|\tilde{v} - u_j|^2}},$$

where each $u_j$ is an encoded frame in video 1. The proximity may then be normalized according to a Gaussian distribution and the loss may be penalized to result in narrow distribution in a final loss term:

$$L_i = \frac{|i - \mu|^2}{\sigma^2} + \lambda \log(\sigma)$$

where $\lambda$ may be a hyperparameter to set the strength of the regularization term, the average position may be defined as:

$$\mu = \sum \beta_k \cdot k, \text{ and}$$

$$\sigma^2 = \sum \beta_k \cdot (k - \mu)^2$$

the variance may be:

for each k between 1 and the length of the sequence.

Figure 5:
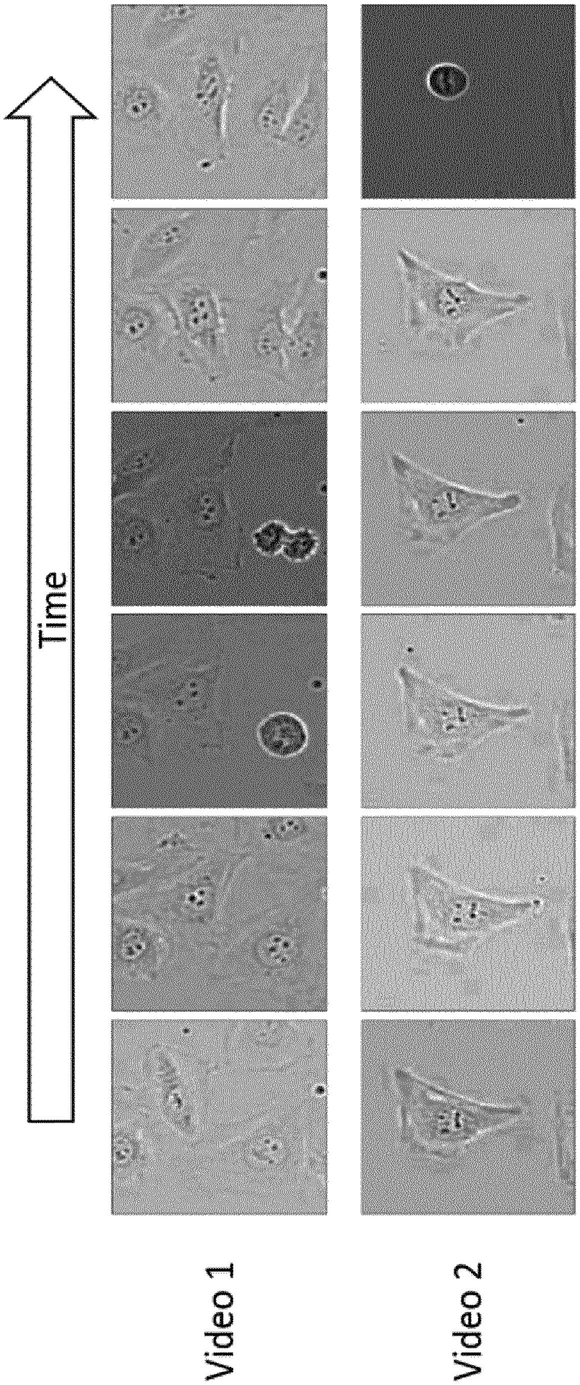
FIG. 5 shows exemplary subsets of frames taken from two exemplary sub-videos before unsupervised alignment.
Figure 6:
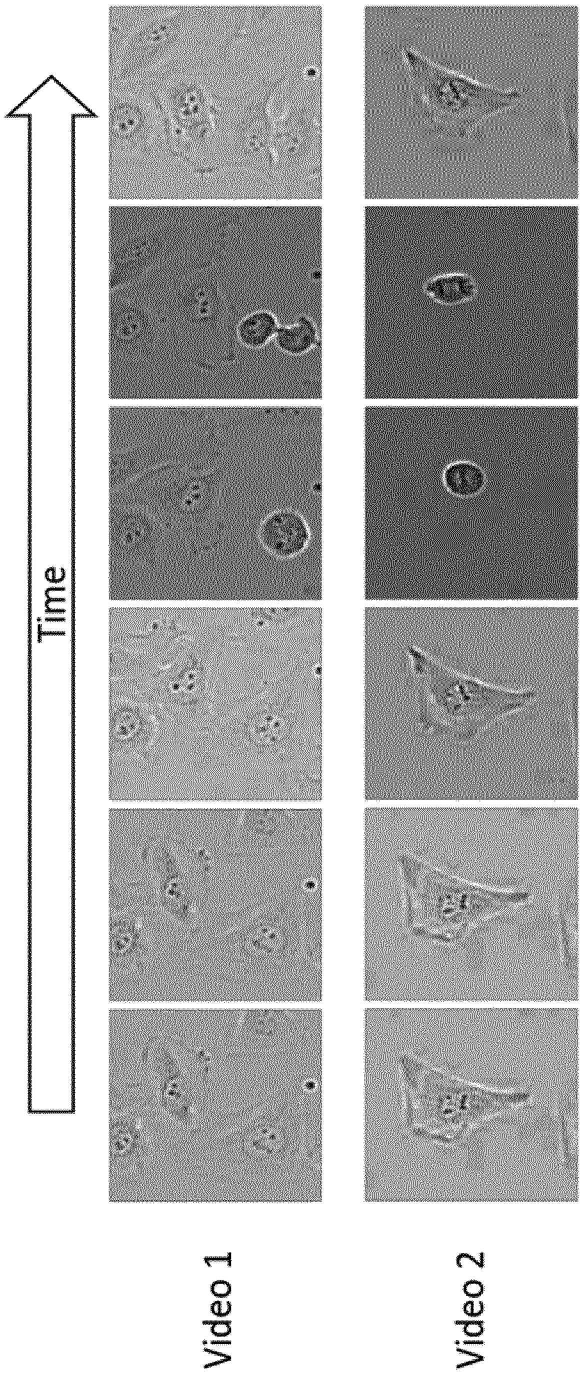
FIG. 6 shows the exemplary subsets of frames shown in FIG. 5 after unsupervised alignment using video 1 as a reference sub-video for alignment.

As one specific example of training the ANN model in step S50 in FIG. 2, in an experiment carried out by the inventors using a base dataset including time-lapse videos of a cell culture, including cell division as the cellular event of interest, a TCC model was trained on 70 sub-videos (e.g., cropped out as stated above with reference to FIG. 3) for 20 000 iterations, batch size of 1 video pair per iteration, using 20 frames per video pair to calculate loss and a fixed learning rate of $10^{-4}$ using the Adam optimizer (see e.g., https://github.com/google-research/google-research/tree/master/tcc). All other hyperparameters were set to the default of the official implementation of TCC (ld.). To validate the model results, a new set of sub-videos were collected, where half of the sub-videos contain cell division, the cellular event of interest, and the other half of the sub-videos do not. Two exemplary sub-videos before alignment are illustrated in FIG. 5. FIG. 5 shows exemplary subsets of frames taken from two exemplary sub-videos before unsupervised alignment. In FIG. 5, the images in each column are from the same point in time. Note that the cell division take place at different points in time. The difference in brightness in the images shown in FIG. 5 is an artifact from intensity normalization when creating the videos for presentation. In this experiment, the trained TCC model was used to align the new set of sub-videos according to a reference video containing cell division. The results of the alignment of the same sub-videos as shown in FIG. 5 are illustrated in FIG. 6. FIG. 6 shows the exemplary subsets of frames shown in FIG. 5 after unsupervised alignment using video 1 as a reference sub-video for alignment. In FIG. 6, the images in each column are from the same point in time after alignment. Note that after alignment, the cell division now happens in the same frames (e.g., fourth and fifth from the left) shown in FIG. 6.

Referring again to FIG. 2, after training the ANN model to perform unsupervised video alignment in step S50, the process may proceed to step S60. In step S60, the computing device 20 may determine whether a query sub-video includes the cellular event of interest using the trained ANN model. In some examples, a query sub-video may be one of the sub-videos that are cropped out from the base dataset in step S30. In other examples, a query sub-video may have been cropped out from a video that is not included in the base dataset.

Figure 7:
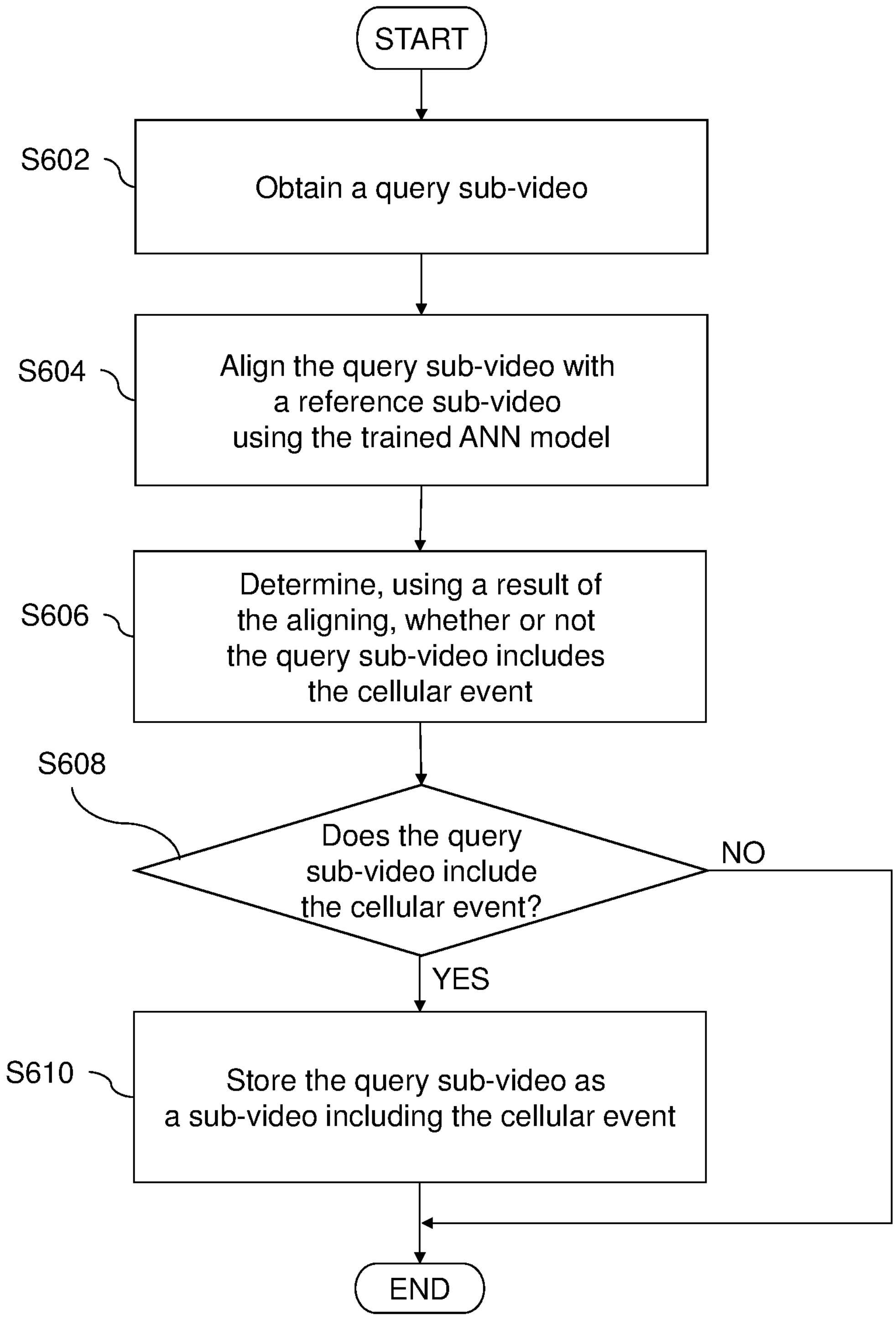
FIG. 7 shows a flowchart of an exemplary detailed process for determining whether a query sub-video includes a cellular event.

FIG. 7 shows a flowchart of an exemplary detailed process of step S60 shown in FIG. 2. The exemplary process shown in FIG. 7 may start when the process of step S60 in FIG. 6 is started.

Referring to FIG. 7, the computing device 20 may obtain a query sub-video in step S602. For example, the query sub-videos may be stored in the data storage device 30 and the computing device 20 may obtain the query sub-video from the data storage device 30. As also stated above, the query sub-video may be either one of the sub-videos that are cropped out from the base dataset in step S30 or a sub-video cropped out from a video that is not included in the base dataset. In other words, the query sub-video may be taken from the base dataset used for training the ANN model or from a dataset other than the base dataset used for training the ANN model.

Further referring to FIG. 7, after step S602, the process may proceed to step S604 and the computing device 20 may align the query sub-video with a reference sub-video using the trained ANN model. The reference sub-video may be selected from the sub-videos used for training the ANN model. In some examples, more than one reference sub-video may be selected and aligned with the query sub-video.

After alignment of the query sub-video with the reference sub-video(s) in step S604, the computing device 20 may determine, using a result of the alignment, whether or not the query sub-video includes the cellular event in step S606. Specifically, for example, if the query sub-video align sufficiently well according to a set threshold of an alignment score, the queried sub-video may be determined to include the cellular event. If not, the query sub-video may be determined not to include the cellular event.

Figure 8:
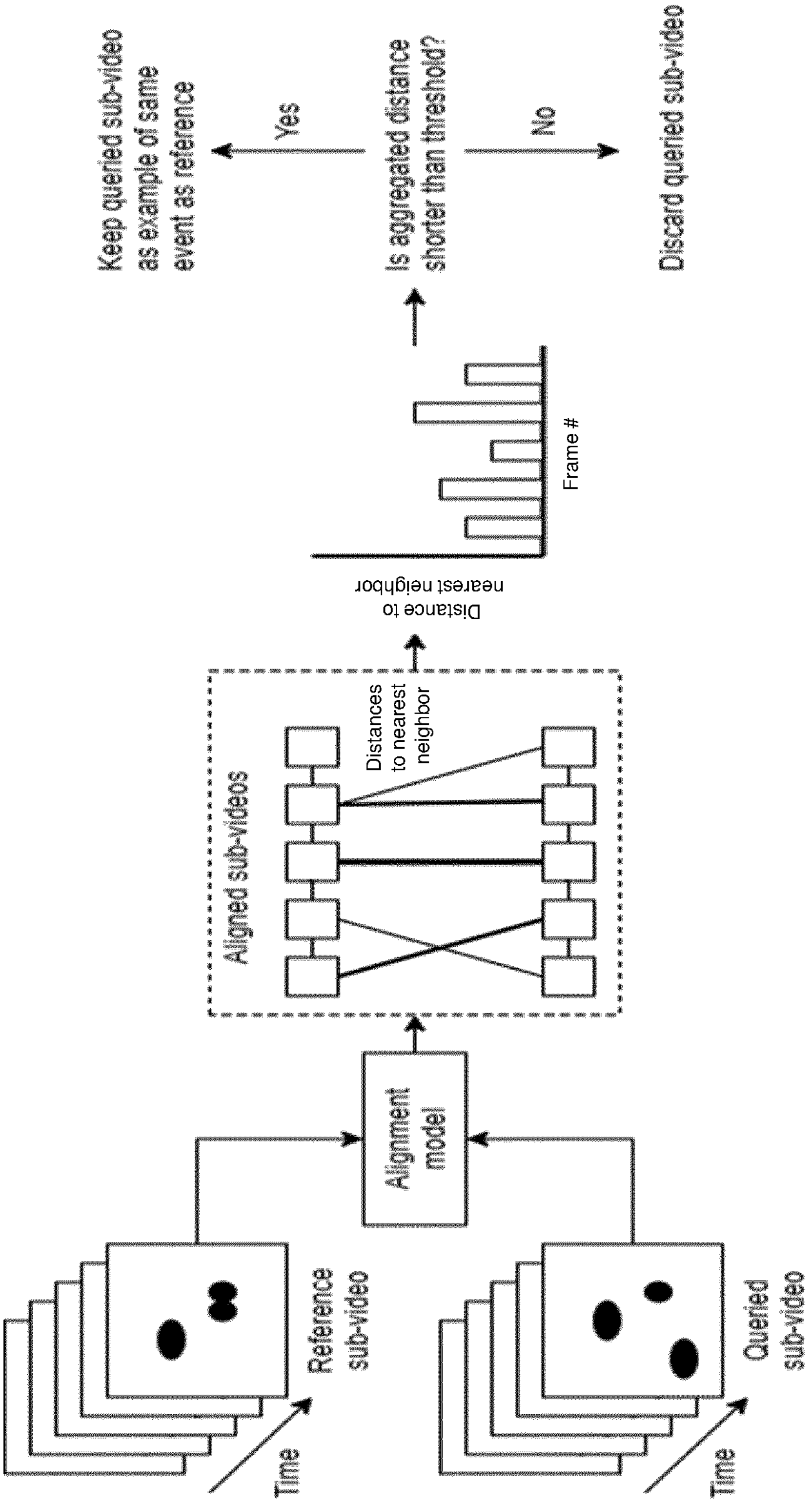
FIG. 8 shows an exemplary workflow for processing a query sub-video.

The alignment score may be determined, for example, by determining, for each frame of the query sub-video, a distance from the frame of the query sub-video to a frame, of the reference sub-video, which is considered to be the nearest neighbor of the frame of the query sub-video. The alignment score may be determined based on the distance determined for each frame of the query sub-video. More specifically, as illustrated in FIG. 8, the alignment score may be calculated based on the frame-by-frame distance to nearest neighbor from the query sub-video to the reference sub-video. For each alignment, a vector of distances may be retrieved with one distance per frame. The alignment score may then be an aggregation of this vector. For instance, the distance vector may be aggregated as an average distance between the query sub-video to the reference sub-video. Alternatively, for example, the maximum distance may be considered as the aggregated distance. In case two or more reference sub-videos are selected, the calculation of the distances as stated above may be performed for each one of the reference sub-videos and the distances calculated for all the reference sub-videos may be aggregated (e.g., as an average distance or the maximum distance), for example.

In the above-stated specific example of determining the aggregated distance as the alignment score based on the distance from each frame of the query sub-video to the nearest neighbor of the reference sub-video, in case the alignment score is smaller than a set threshold, the query sub-video may be determined to include the cellular event of interest. Further, in this specific example, in case the alignment score is equal to or greater than the set threshold, the query sub-video may be determined not to include the cellular event of interest.

In some other examples, however, the alignment score may be determined in a manner such that the larger the alignment score is, the better the query sub-video is aligned with the reference sub-video. In such a case, the query sub-video may be determined to include the cellular event if the alignment score is greater than a set threshold and the query sub-video may be determined not to include the cellular event.

Referring again to FIG. 7, after determining whether or not the query sub-video includes the cellular event in step S606, the process may proceed to step S608. In case the query sub-video is determined to include the cellular event (YES in step S608), the computing device 20 may store the query sub-video as a sub-video including the cellular event in step S610 and then end the exemplary process shown in FIG. 7. In case the query sub-video is determined not to include the cellular event (NO in step S608), the computing device 20 may end the exemplary process shown in FIG. 7.

In some specific examples, as also shown in FIG. 8, when the query sub-video is determined not to include the cellular event (NO in step S608 of FIG. 7), the query sub-video may be discarded.

It is noted that the exemplary process shown in FIG. 7 may be repeated in case more than one query sub-videos are subject to the determination as to whether or not the query sub-video includes the cellular event. For example, in some circumstances, the exemplary process shown in FIG. 7 may be performed for some or all of the sub-videos cropped out from the base dataset in step S30 of FIG. 2. In other circumstances, for instance, the exemplary process shown in FIG. 7 may be performed for a plurality of sub-videos cropped out from a dataset newly collected in a manner analogous to that for the base dataset. In case the exemplary process shown in FIG. 7 is repeated for a plurality of query sub-videos, one or more query sub-videos including the cellular event can be retrieved from a set of query sub-videos.

After the exemplary process shown in FIG. 7 ends, step S60 of the exemplary process shown in FIG. 2 may also end.

Referring again to FIG. 2, step S10 to S50 may be understood as pre-processing steps of videos for determination of the cellular event in step S60. In some exemplary embodiments, the pre-processing steps S10 to S50 and the determination step S60 may be performed by the computing device 20 implemented with a single device, for example, a computer integrated with the microscopic imaging system 10 or a computer separate from but connected to the microscopic imaging system 10. In other exemplary embodiments, the pre-processing steps S10 to S50 and the determination step S60 may be performed by separate computers. In such embodiments, the trained ANN model may be deployed to a computer (e.g., a remote computational server, an image processing device, etc.) that has access to query sub-videos and that is separate from the computer that has performed the pre-processing steps S10 to S50.

Specific Examples of Video Alignment in Case of Cell Division

Figure 9:
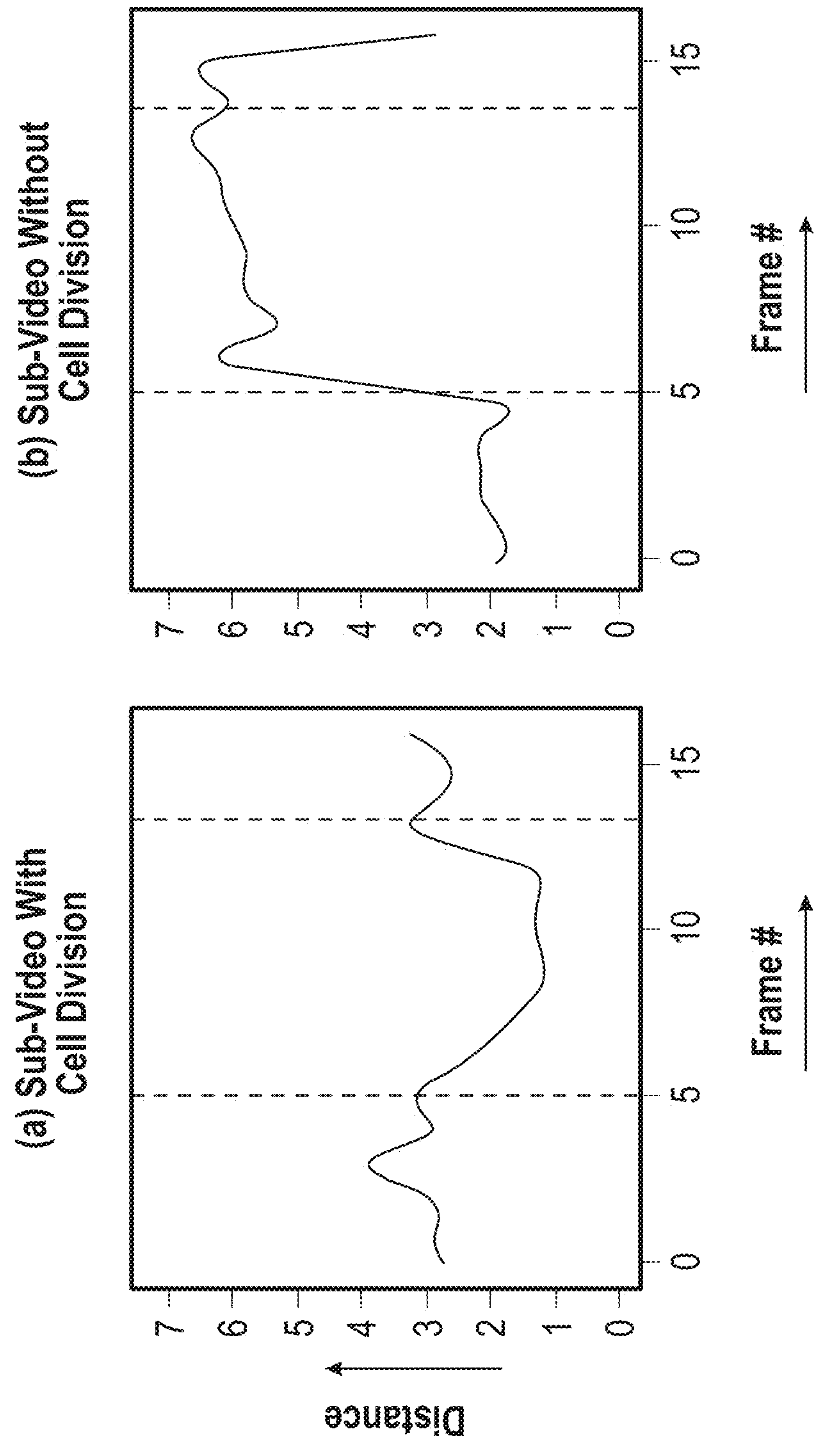
FIG. 9 shows illustrative examples of frame-wise distance to nearest video to a reference sub-video containing cell division.
Figure 10A:
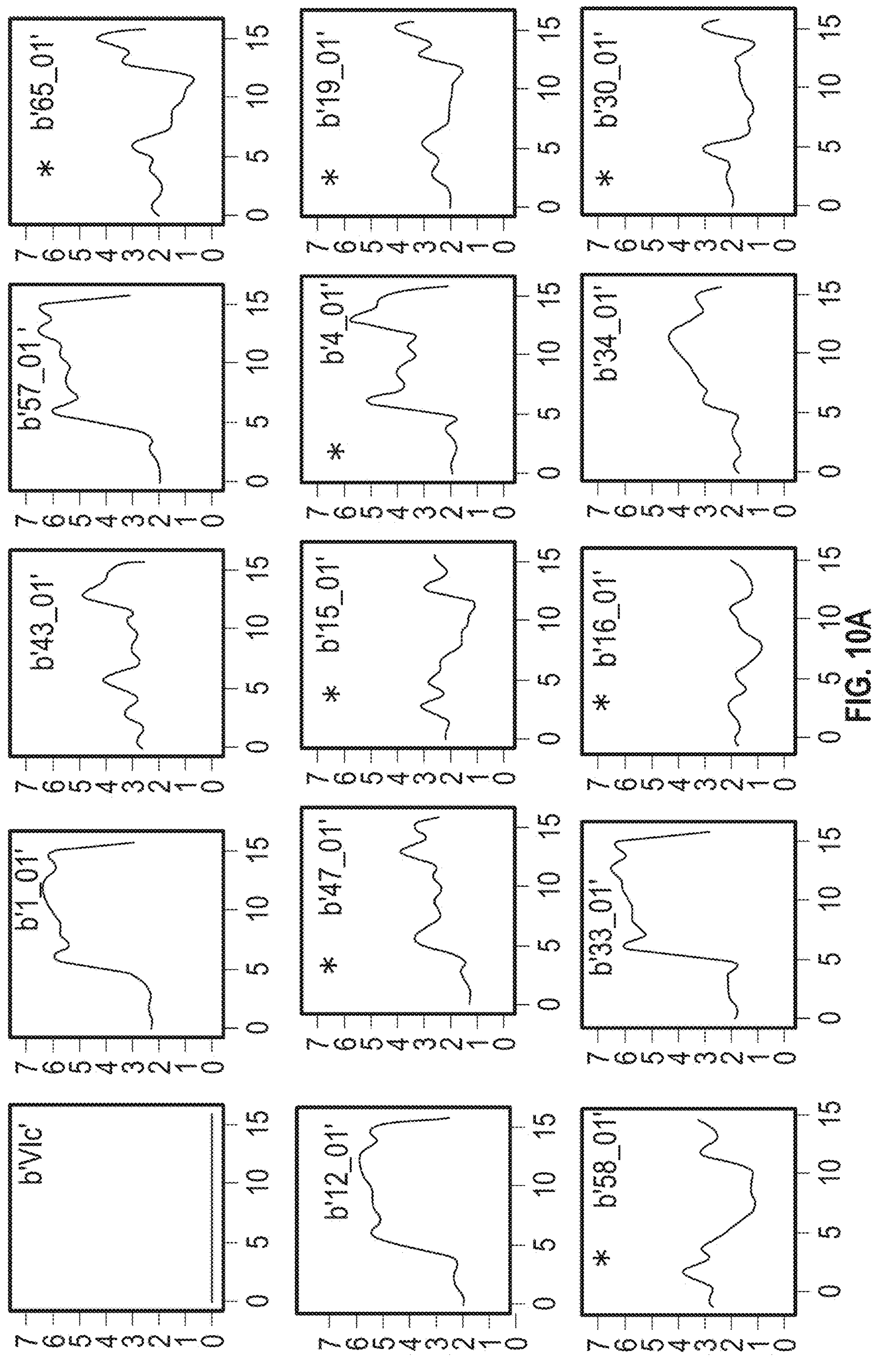
FIGS. 10A-10F show distances to nearest neighbor in reference for reference sub-video (top-left) and 63 aligned query sub-videos from a validation set.
Figure 10B:
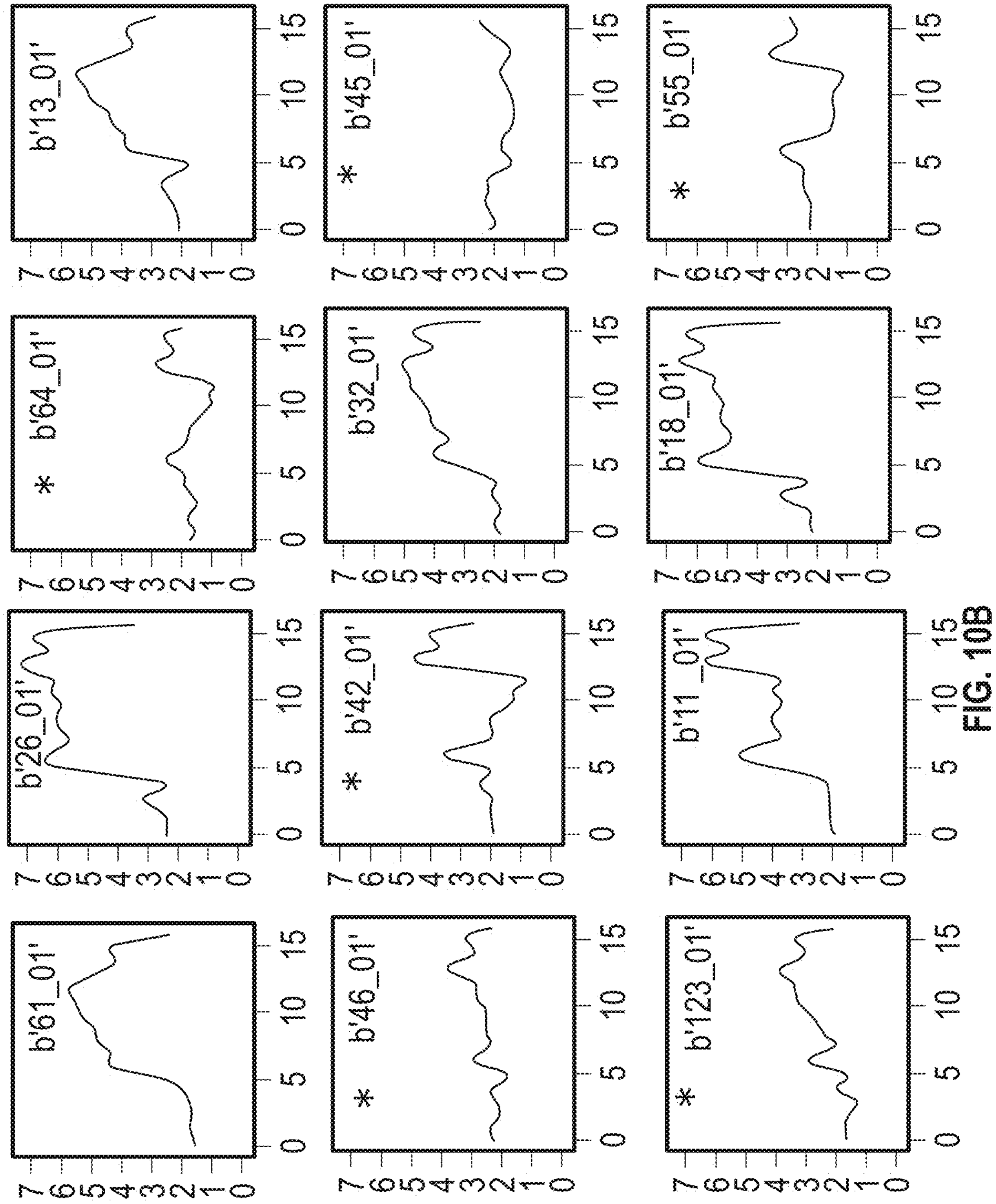
Figure 10C:
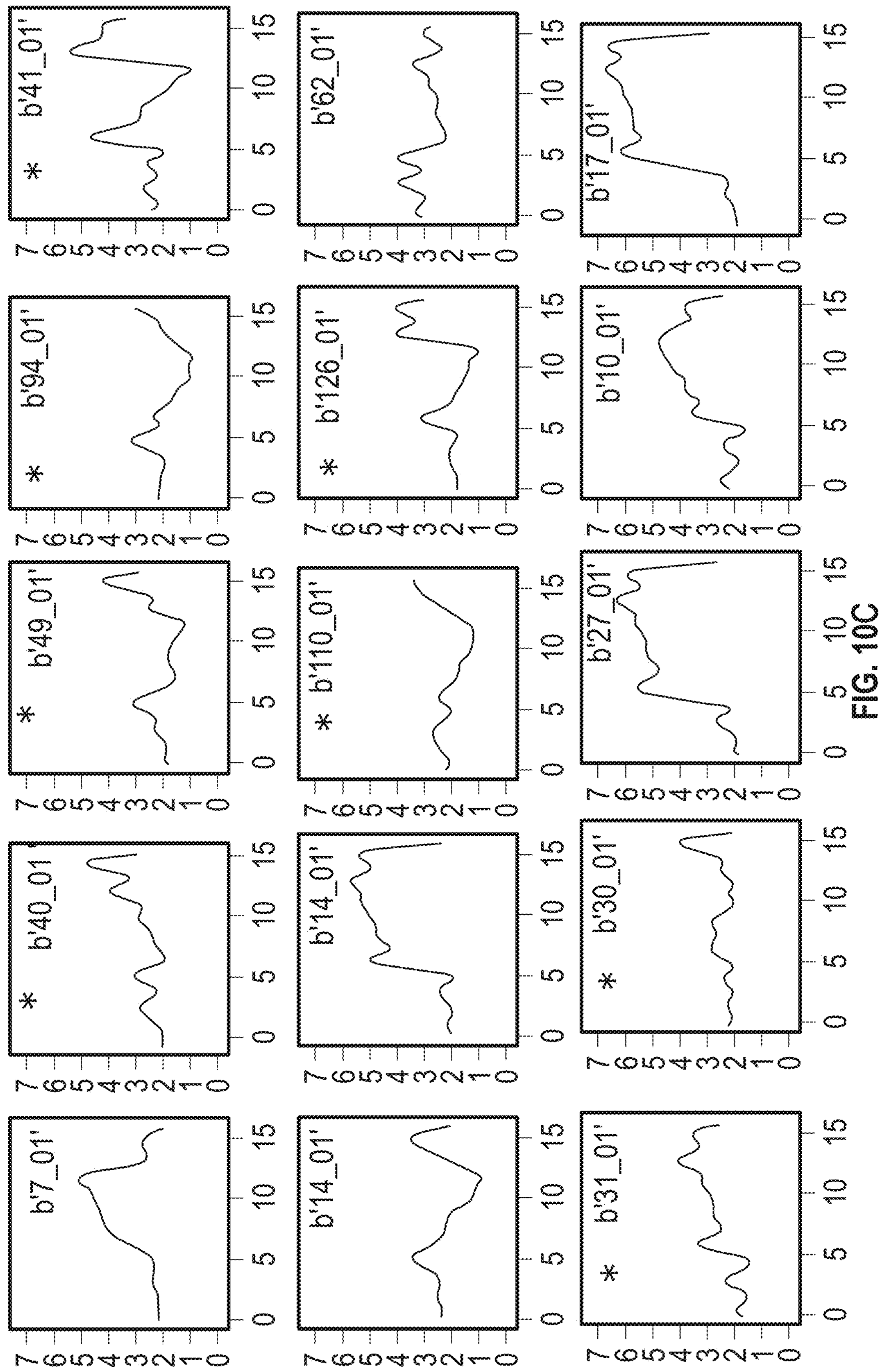
Figure 10D:
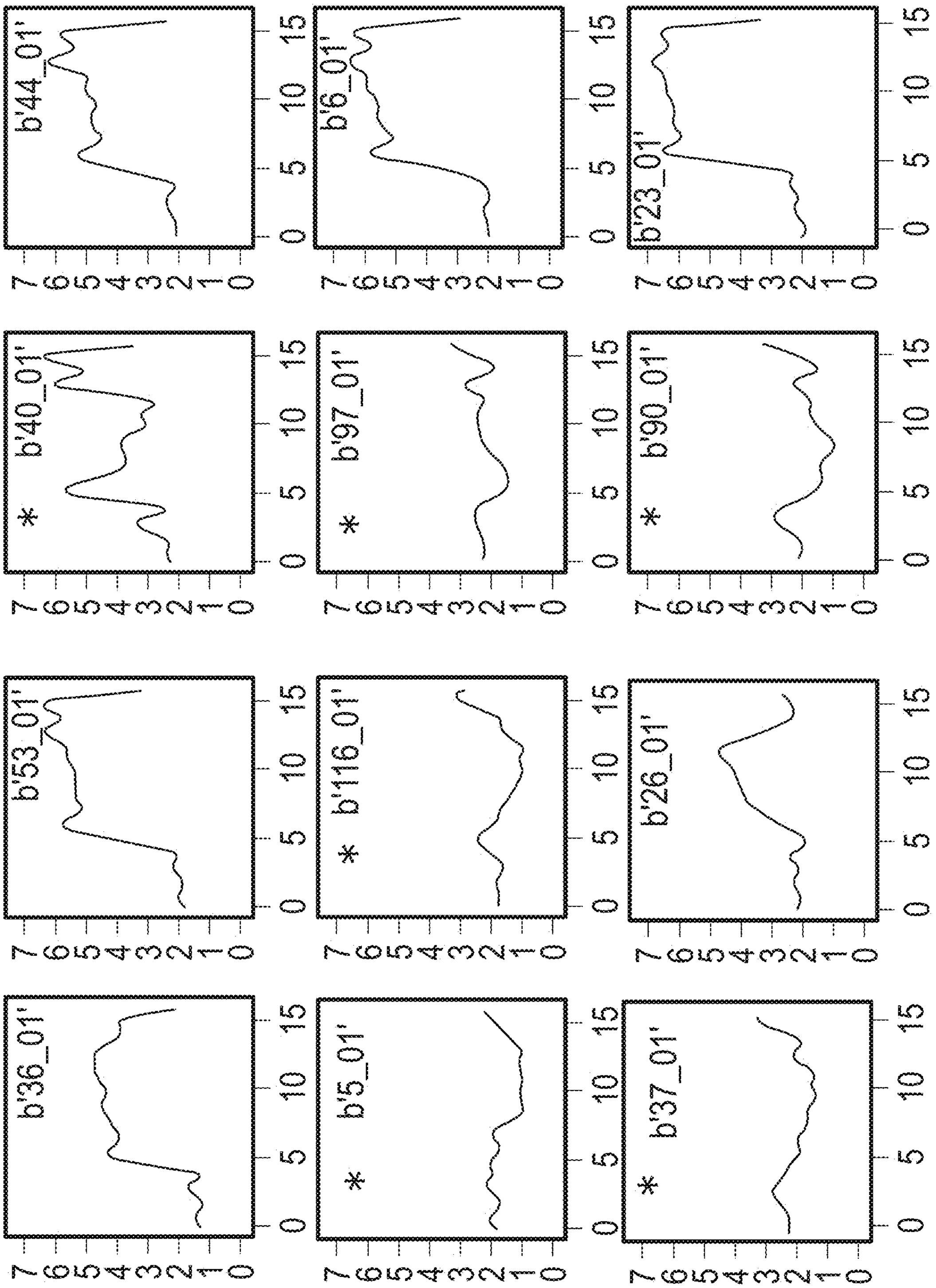
Figure 10E:
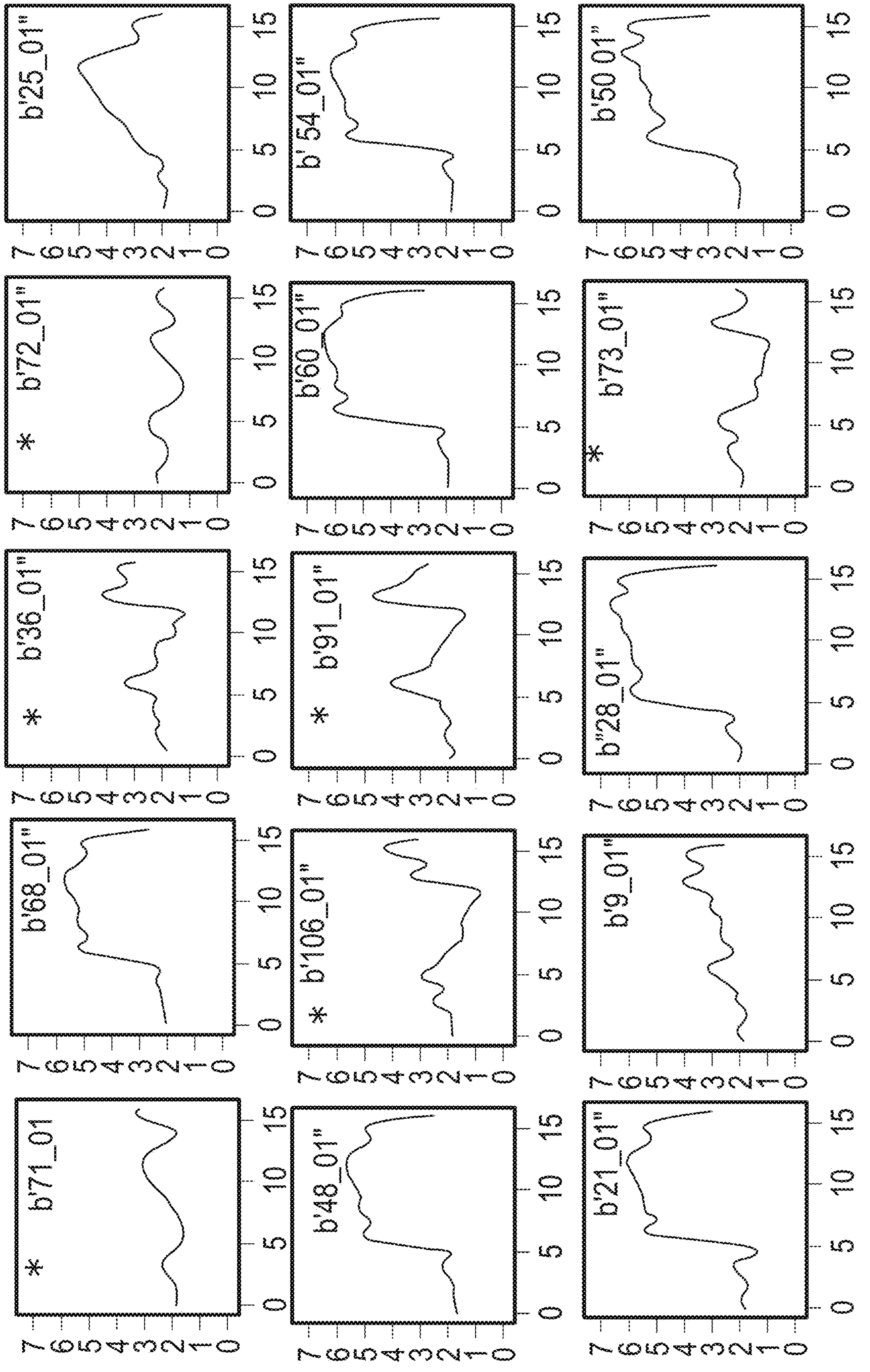
Figure 10F:
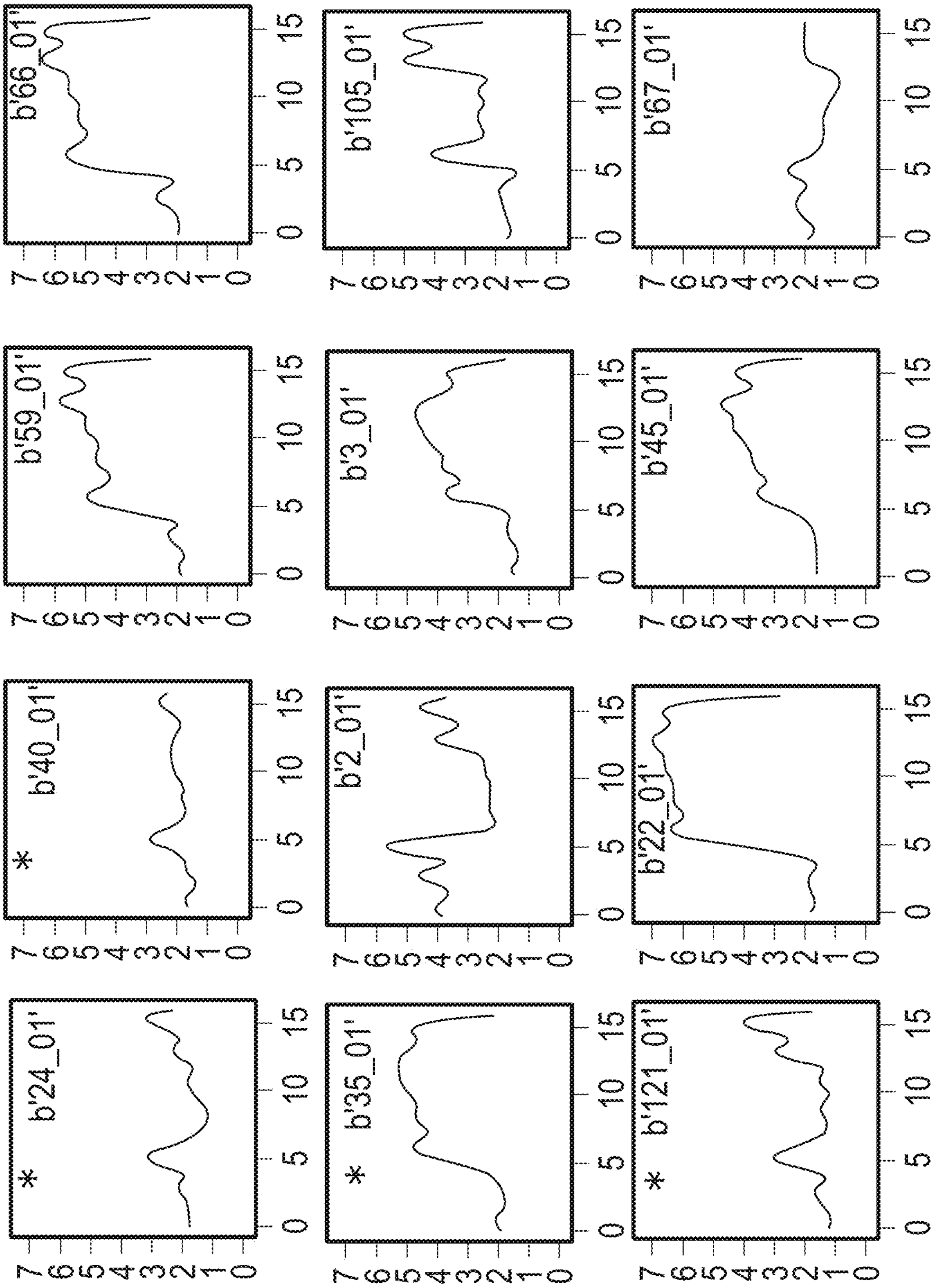

FIGS. 9 and 10 show exemplary results of alignment of query sub-videos with a reference sub-video, based on which it may be determined which query sub-videos include cell division, the cellular event of interest in this particular example. The exemplary results shown in FIGS. 9 and 10 were obtained by alignment using the ANN model, more specifically, the TCC model, trained in the experiment carried out by the inventors as stated above with reference to FIGS. 5 and 6.

In the experiment carried out by the inventors, the trained TCC model was used to serve as a basis for searching for cell divisions happening. During alignment (see e.g., step S604 of FIG. 7), for each frame in the reference sub-video, a frame in the query sub-video with the shortest Euclidean distance to the reference frame was identified. This variation of shortest distance relative to the reference video can be used to distinguish between sub-videos containing the cellular event of interest or not, in this case cell division. If the query sub-video contains an example of cell division, a decrease or no change in shortest distance may be observed during the time which cell division occurs relative to the frames immediately before. On the other hand, if cell division does not occur in the query sub-video, an increased shortest distance during cell division may be observed. This difference is illustrated in FIG. 9.

FIG. 9 shows illustrative examples of frame-wise distance to nearest video to a reference sub-video containing cell division. In FIG. 9, the Y-axes show the Euclidean distances and the X-axes show time positions in the corresponding sub-video after alignment. The vertical dashed lines indicate start and end of cell division in the reference sub-video. FIG. 9 (*a*) shows an example of the distances fora sub-video with cell division and FIG. 9 (*b*) shows an example of the distances for a sub-video without cell division.

A more comprehensive visualization of the experimental results is shown in FIGS. 10A-10F. FIGS. 10A-10F show distances to nearest neighbor in reference for reference sub-video (top-left) and 63 aligned query sub-videos from a validation set. Queried sub-videos containing cell division are marked with asterisk (*). For each diagram, the distance to nearest neighbor in the reference sub-video is shown on the Y-axis and the reference frames are shown on the X-axis. Each sub-video contains 25 frames, and cell division starts after 5 frames in the reference sub-video.

The shortest distances as stated above can then be used to determine whether it may be considered likely that the query sub-video contains a cell division. Provided that the start and the end of the cell division are marked in the reference sub-video, the frame-wise shortest distances outside of cell division and during cell division can be separated. If the average distances during cell division are significantly larger than the distances outside cell division (for example by using Wilcoxon rank sum test), it may be concluded that the query sub-video does not contain a cell division. If the difference in distances is not significantly larger, it may be concluded that the query sub-video contains cell division.

Exemplary Application—Comparison of Different Cell Cultures

The method according to the present disclosure may be used to measure relative effects of experimental interventions on a cellular event of interest. For instance, in case cell cultures are grown under different conditions (e.g., treatment of different compounds, different temperatures, etc.), a training set may be selected to be balanced over the different treatments. A TCC-model may then be trained as described above with reference to FIGS. 2 and 4 to align the cellular event of interest. The training set may then be split according to the experimental interventions and the distances to nearest neighbor may be calculated not only within each treatment, but also between different treatments. To statistically test if the within-treatment variation in shortest distances is different from the between-treatment variation, a Kruskal-Wallis test for difference in population means may be used (see e.g., W. H. Kruskal and W. A. Wallis, "Use of Ranks in One-Criterion Variance Analysis," J. Am. Stat. Assoc., vol. 47, no. 260, pp. 583-621, December 1952, doi: 10.1080/01621459.1952.10483441). Alternatively, many examples may be retrieved from each treatment by using the query method as described above with reference to FIGS. 7 and 8.

In case there is a control culture, the relative differences of different treatments relative to the control may be calculated. These relative measures may give an abstract measure of how much the cellular event of interest is influenced by the treatment, with possible statistical significance. This procedure may serve as guidance to a biologist on which aspects to investigate in depth.

Exemplary Application—Cell Differentiation

A further example of a cellular event that can be studied using time-lapse videos may be cell differentiation. Cell differentiation may be understood as a process over time in which one cell type changes to another. Usually, a cell may change from a more general cell type, for instance a stem cell, into a more specialized one, for instance an immune cell. Studies of cell differentiation may be important to understand how tissues form and what may go wrong, how the immune system functions and/or how cancer progress, for example. Typical studies may involve fluorescent labelling of a marker indicating cell differentiation. Labelling, however, may impose two limitations. First, labelling itself may influence biology either directly or indirectly by phototoxicity caused by the extra light used to emit the fluorescent label. Second, the target of labelling may not be expressed until late in the differentiation progression.

Figure 11:
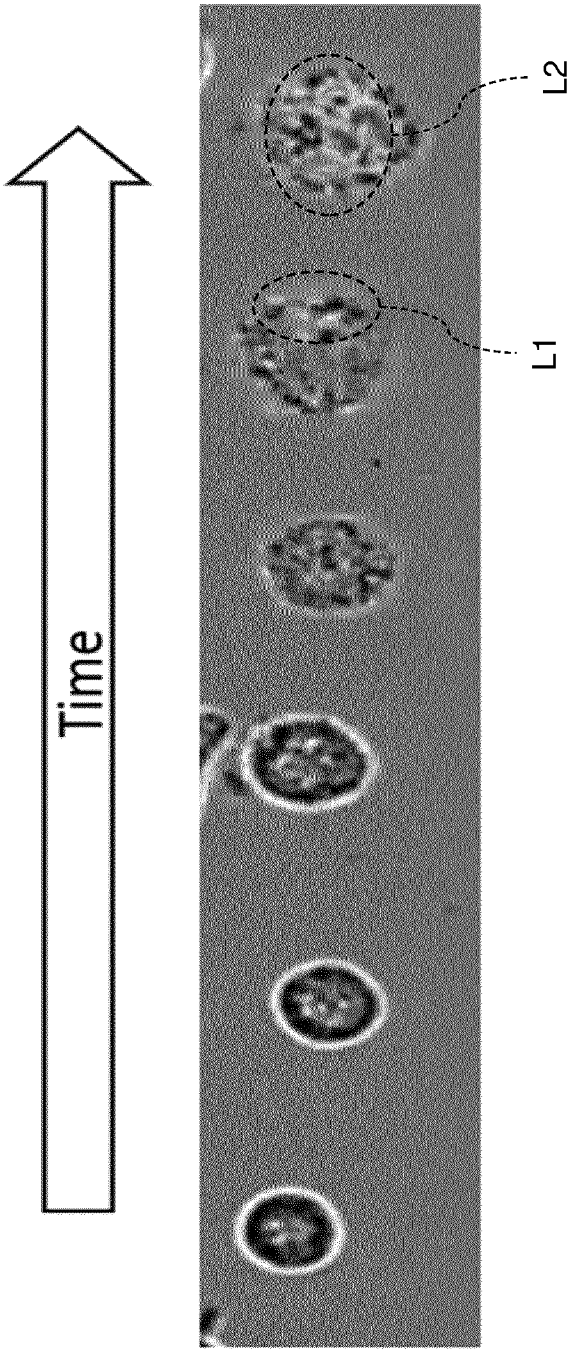
FIG. 11 shows an example of a THP-1 cell undergoing cell differentiation.

FIG. 11 shows an example of a THP-1 cell undergoing cell differentiation. In FIG. 11, the THP cell is labeled with IncuCyte® FabFluor-488 tagged CD 11b antibody fluorescent label in binding to areas L1, L2. It is noted that the cell clearly changes appearance before the label is expressed.

With the method according to the present disclosure, a label-free method may be provided to quantify cell differentiation in a cell culture by letting an expert select a training set of sub-videos displaying cell differentiation. By training a TCC model with such a training set as described above with reference to FIGS. 2 and 4, the trained TCC model may be used to query the complete dataset for more examples of cell differentiation, as described above with reference to FIGS. 7 and 8.

To simply retrieve cell differentiation, supervised models trained to predict the onset of the fluorescent label based on the unlabeled image (see e.g., F. Buggenthin et al., "Prospective identification of hematopoietic lineage choice by deep learning," Nat. Methods, vol. 14, no. 4, pp. 403-406, April 2017, doi: 10.1038/nmeth.4182) may also be employed. With the method according to the present disclosure, however, the relative durations of different phases of cell differentiation may also be measured by aligning to a reference video that may have been annotated with such phases.

Variations

In case of analyzing videos of cell division as the cellular event of interest, when the cell undergoing division is clearly in the middle of field-of-view, the difference in distances between frames of the query sub-video and the reference sub-video may be more pronounced (cf. experimental results as described above with reference to FIGS. 9 and 10). Accordingly, depending on the cell type and application, the performance can be improved by creating sub-videos where a single cell is in the middle of field-of-view and the surroundings are masked out. To mask out the single cell, a cell segmentation model may be employed. For example, a convolutional neural network based on the Mask-RCNN architecture (see e.g., K. He, G. Gkioxari, P. Dollãr, and R. Girshick, "Mask R-CNN", 2017) may be employed to outline individual cells and mask out the surroundings. Alternatively, a tighter bounding box (cf. areas 1 and 2 of FIG. 3) may be used so that less surrounding context is shown in each sub-video.

Figure 12:
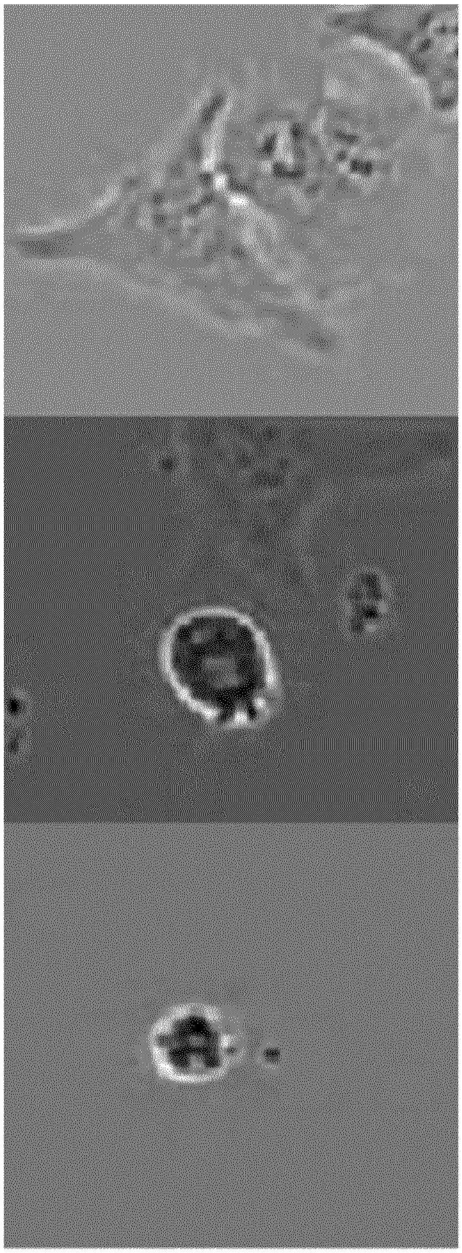
FIG. 12 shows examples of (a) a dead cell (left), (b) a dividing HeLa cell (middle) and (c) non-dividing HeLa cells (right).

Further, in case of analyzing cell division, the system according to the exemplary embodiments as described above might introduce some false positives for sub-videos containing a dead cell. FIG. 12 shows examples of (a) a dead cell (left), (b) a dividing HeLa cell (middle) and (c) non-dividing HeLa cells (right). Dead cells may look small and globular in appearance and may resemble a cell currently undergoing division. For example, since HeLa cells that are used in the exemplary experiment as stated above with reference to FIGS. 5 and 6 may normally appear flat, the globular appearance may be a stark difference to their non-dividing appearance, which may in turn increase the risk of dead cells being retrieved as dividing cells. A simple solution to this problem may be to filter out sub-videos containing dead cells before video query. This may be done simply by an image classifier trained to distinguish between dead and living cells.

In some exemplary embodiments, an alternative approach to distinguish between sub-videos containing the cellular event of interest and others may be employed. For example, instead of using the distances between frames of the query sub-videos and the reference sub-video, a system for outlier detection in neural networks, e.g., a method based on a latent variable approximation of the embedding of all training sub-videos may be used (see e.g., US 2020/0074269 A1). In this case, for each sub-video in the training set, a sequence of neural network embeddings may be obtained. Using the embeddings for the cellular event of interest, an outlier detection module may be fit so that the outlier detection module can describe the characteristics of the cellular event over time based not only on one reference video but also on all the sub-videos in the training set. Although for a distinct event such as cell division, the outlier detection may not be necessary, for more subtle events happening over longer periods of time (for instance cell differentiation), the outlier detection may better capture the subtleties in order to reliably retrieve further examples of the cellular event as compared to the use of a single reference video.

Hardware Configuration

Figure 13:
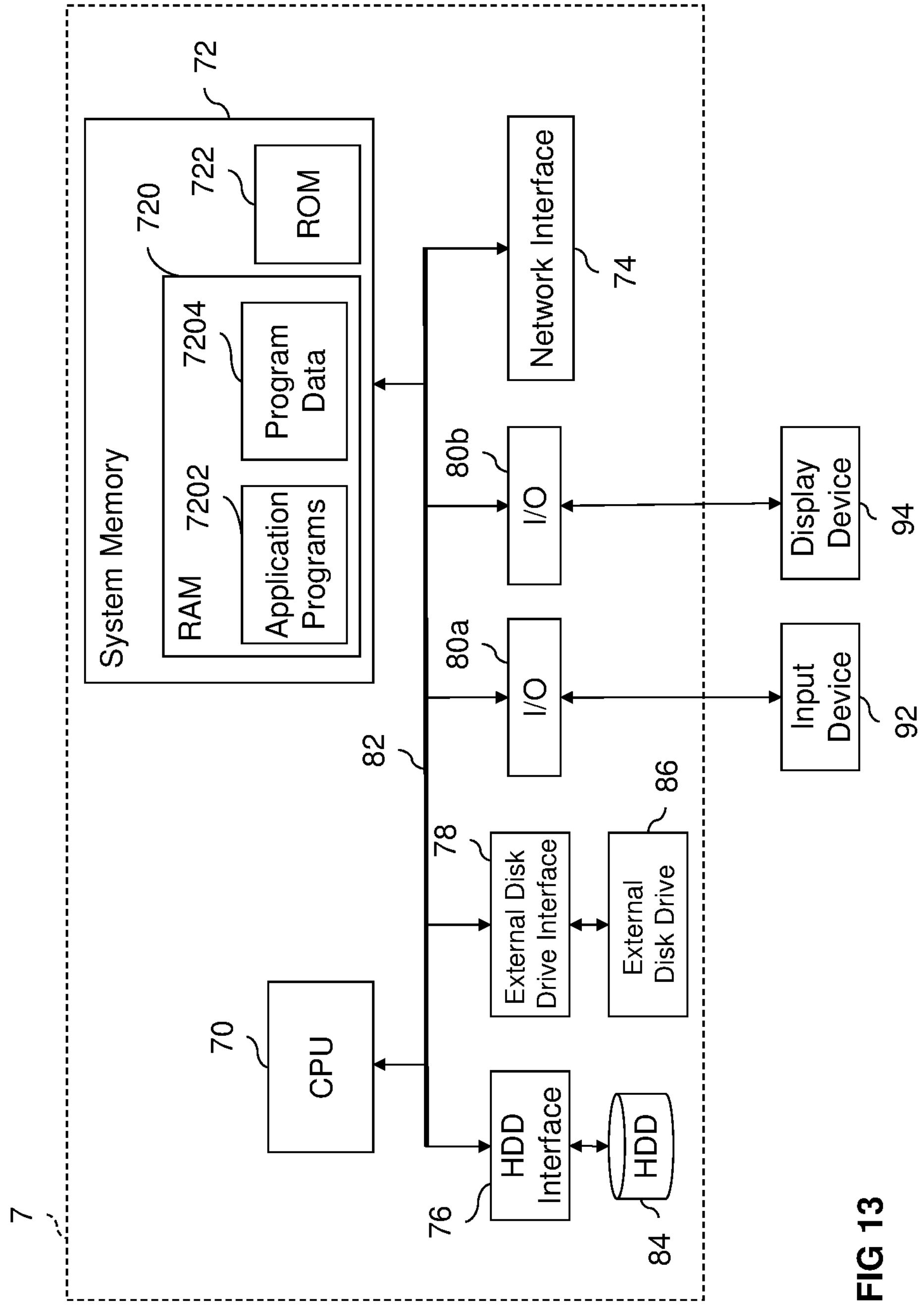
FIG. 13 shows an exemplary hardware configuration of a computer that may be used to implement at least a part of a system according to the present disclosure.

FIG. 13 shows an exemplary hardware configuration of a computer that may be used to implement at least a part of the system as described above. For example, the computing device 20 shown in FIG. 1 may be implemented with the computer 7 shown in FIG. 13. The computer 7 shown in FIG. 13 includes a central processing unit (CPU) 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures. The CPU 70 may be further connected to a microscopic imaging device (not shown) via a corresponding interface (not shown) and the bus 82.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80*a* and 80*b* as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 13, the computer 7 may further be connected to a printer and/or an imaging device such as a camera, via corresponding I/O interfaces and the system bus 82.

In addition or as an alternative to an implementation using a computer 7 as shown in FIG. 13, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A computer-implemented method for analyzing videos of a living system captured with microscopic imaging, the method comprising:

obtaining a base dataset including one or more videos captured with microscopic imaging, at least one of the one or more videos including a cellular event;

cropping out, from the base dataset, sub-videos including one or more objects of interest that may be involved in the cellular event, wherein more than one sub-video is cropped out from each video including in the base dataset, wherein the cropping out of the sub-videos includes:

identifying and localizing the one or more objects of interest within the one or more videos included in the base dataset using a localization algorithm; and cropping out sub-videos following one or more objects of interest throughout a duration of each video included in the data set;

receiving information indicating a plurality of sub-videos selected from among the sub-videos that are cropped out from the base dataset, the plurality of selected sub-videos including the cellular event;

training an artificial neural network (ANN) model, using the plurality of selected sub-videos as training data, to perform unsupervised video alignment;

obtaining a query sub-video, the query sub-video being:

one of the sub-videos that are cropped out from the base dataset, or a sub-video cropped out from a video that is captured with microscopic imaging and that is not included in the base dataset;

aligning, using the trained ANN model, the query sub-video with a reference sub-video that is one of the plurality of selected sub-videos; and determining, according to a result of the aligning, whether or not the query sub-video includes the cellular event.

2. The method according to claim 1, wherein each of the one or more objects of interest is a cell or a group of cells.

3. The method according to claim 1, wherein the training of the ANN model is performed based on temporal cycle-consistency learning.

4. The method according to claim 1 wherein the aligning of the query sub-video with the reference sub-video comprises:

determining, for each frame of the query sub-video, a distance from the frame of the query sub-video to a frame, of the reference sub-video, which is considered to be a nearest neighbor of the frame of the query sub-video; and determining an alignment score of the query sub-video based on the distance determined for each frame of the query sub-video, wherein the determination as to whether or not the query sub-video includes the cellular event is made based on the alignment score.

5. The method according to claim 1, wherein the localization algorithm is a convolutional neural network trained for detecting the one or more objects of interest.

6. The method according to claim 1, wherein the cropping out of the sub-videos includes:

processing the base dataset according to a tracking algorithm to follow movement of the one or more objects of interest between frames of each video included in the base dataset.

7. The method according to claim 1, wherein the method further comprises, before cropping out the sub-videos:

processing the base dataset according to a video stabilization algorithm for reducing effect of jitter between frames of each video included in the base dataset.

8. A computer-implemented method for analyzing videos of a living system captured with microscopic imaging, the method comprising:

obtaining a base dataset including one or more videos captured with microscopic imaging, at least one of the one or more videos including a cellular event;

cropping out, from the base dataset, sub-videos including one or more objects of interest that may be involved in the cellular event, wherein more than one sub-video is cropped out from each video included in the base dataset, wherein the cropping out of the sub-videos includes:

identifying and localizing the one or more objects of interest within the one or more videos included in the base dataset using a localization algorithm; and cropping out sub-videos following one or more objects of interest throughout a duration of each video included in the base dataset;

receiving information indicating a plurality of sub-videos selected from among the sub-videos that are cropped out from the base dataset, the plurality of selected sub-videos including the cellular event;

training an artificial neural network (ANN) model, using the plurality of selected sub-videos as training data, to perform unsupervised video alignment; and storing, in a storage medium, the trained ANN model and at least one of the plurality of selected sub-videos.

9. The computer-implemented method of claim 8, the method further comprising:

obtaining a query sub-video, the query sub-video being:

one of the sub-videos that are cropped out from the base dataset, or a sub-video cropped out from a video that is captured with microscopic imaging and that is not included in the base dataset;

aligning, using the ANN model, the query sub-video with a reference subvideo that is one of the plurality of selected sub-videos; and determining, according to a result of the aligning, whether or not the query sub-video includes the cellular event.

10. A non-transitory computer-readable medium having stored thereon instructions that, when loaded and run on a computer, cause the computer to perform the method according to claim 1.

11. A system for analyzing videos of a living system captured with microscopic imaging, the system comprising:

a storage medium storing a base dataset including one or more videos captured with microscopic imaging, at least one of the one or more videos including a cellular event and an artificial neural network (ANN) model for performing unsupervised video alignment; and a processor configured to:

obtain the base dataset from the storage medium;

crop out, from the base dataset, sub-videos including one or more objects of interest that may be involved in the cellular event, wherein more than one sub-video is cropped out from each video included in the base dataset, wherein the cropping out of the sub-videos includes:

identifying and localizing the one or more objects of interest within the one or more videos included in the base dataset using a localization algorithm; and cropping out sub-videos following one or more objects of interest throughout a duration of each video included in the base dataset;

receive information indicating a plurality of sub-videos selected from among the sub-videos that are cropped out from the base dataset, the plurality of selected sub-videos including the cellular event;

train the ANN model, using the plurality of selected sub-videos as training data, to perform unsupervised video alignment;

obtain a query sub-video, the query sub-video being:

one of the sub-videos that are cropped out from the base dataset, or a sub-video cropped out from a video that is captured with microscopic imaging and that is not included in the base dataset;

align, using the trained ANN model, the query sub-video with a reference sub-video that is one of the plurality of selected sub-videos; and determine, according to a result of the aligning, whether or not the query sub-video includes the cellular event.

12. The system according to claim 11, wherein each of the one or more objects of interest is a cell or a group of cells; and/or wherein the training of the ANN model is performed based on temporal cycle-consistency learning.

13. The system according to claim 11, wherein the processor is further configured to, when aligning the query sub-video with the reference sub-video:

determine, for each frame of the query sub-video, a distance from the frame of the query sub-video to a frame, of the reference sub-video, which is considered to be a nearest neighbor of the frame of the query sub-video; and determine an alignment score of the query sub-video based on the distance determined for each frame of the query sub-video, wherein the determination as to whether or not the query sub-video includes the cellular event is made based on the alignment score.

14. The system according to claim 11, wherein the localization algorithm is a convolutional neural network trained for detecting the one or more objects of interest; and/or wherein the processor is further configured to, when cropping out the sub-videos, process the base dataset according to a tracking algorithm to follow movement of the one or more objects of interest between frames of each video included in the base dataset.

15. The system according to claim 11, wherein the processor is further configured to, before cropping out the sub-videos:

process the base dataset according to a video stabilization algorithm for reducing effect of jitter between frames of each video included in the base dataset.

* * * * *